United States Patent
Nakano et al.

Patent Number: 5,717,815
Date of Patent: Feb. 10, 1998

[54] COMPRESSION DATA EDITING APPARATUS

[75] Inventors: Hiroshi Nakano; Satoshi Takagi; Masahito Mori, all of Kanagawa; Masao Sasaki, Kanaagawa, all of Japan

[73] Assignee: Sony Corporation, Tokyo, Japan

[21] Appl. No.: 750,399

[22] PCT Filed: Apr. 8, 1996

[86] PCT No.: PCT/JP96/00960

§ 371 Date: Mar. 21, 1997

§ 102(e) Date: Mar. 21, 1997

[30] Foreign Application Priority Data

Apr. 7, 1995 [JP] Japan ................................ 7-108202

[51] Int. Cl.$^6$ ................................................ H04N 5/76
[52] U.S. Cl. ........................... 386/53; 386/54; 386/111
[58] Field of Search .......................... 386/4, 33, 52–54, 386/64, 96, 109, 111–112; 348/423, 512, 515, 595; H04N 5/76

[56] References Cited

U.S. PATENT DOCUMENTS

| | | | |
|---|---|---|---|
| 4,644,400 | 2/1987 | Kouyama et al. | 386/54 |
| 5,386,581 | 1/1995 | Suzuki et al. | 386/52 |
| 5,557,423 | 9/1996 | Phillip et al. | 386/96 |

FOREIGN PATENT DOCUMENTS

| | | |
|---|---|---|
| 1-312781 | 12/1989 | Japan. |
| 5-210953 | 8/1993 | Japan. |

*Primary Examiner*—Andrew Faile
*Assistant Examiner*—Vincent F. Boccio
*Attorney, Agent, or Firm*—William S. Frommer; Alvin Sinderbrand

[57] ABSTRACT

In a compression data editing apparatus, a smooth switching (edition) having no noise is enabled to be performed. A code train 10 is supplied to an MPEG decoding circuit 2 and is delayed by a fixed time and, after that, it is decoded into an audio signal. In this instance, the operation is temporarily stopped for a block which is repeated. When an offset value extracted by an offset extracting circuit 3 lies within a predetermined range, the repeat pulse is detected and supplied to the circuit 2. A flag is set to a frame in which the pulse is detected. In the circuit 2, the decoding is temporarily stopped in the code block which corresponds to the pulse and was recorded at the second time. The decoding is restarted after the next block was inputted. In the circuit 2, the supplied code train 10 is supplied to, for example, a synthesis filter of 512 taps and is converted into the audio signal. Therefore, data of 256 samples near the boundary of the adjacent blocks is mutually influenced and a correct audio signal 14 is outputted.

18 Claims, 18 Drawing Sheets

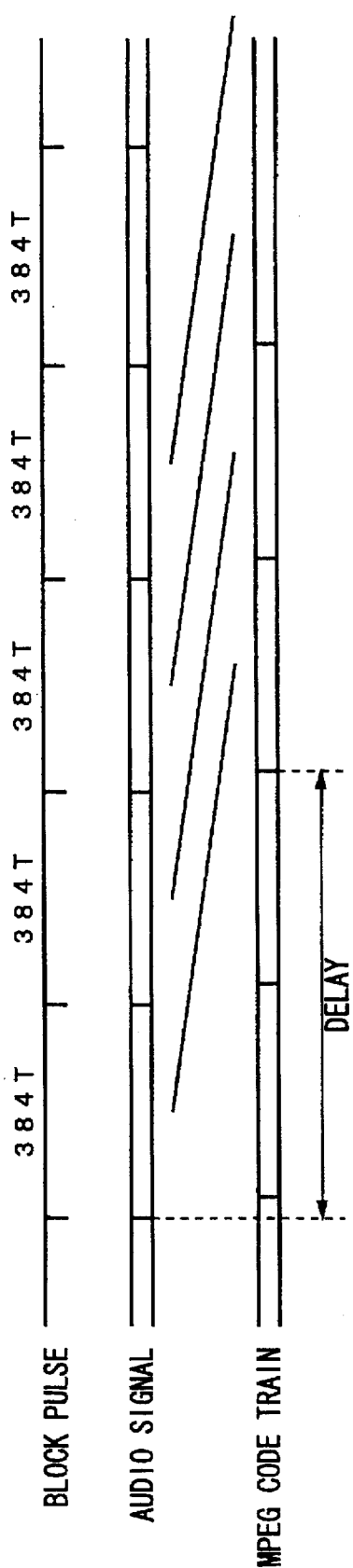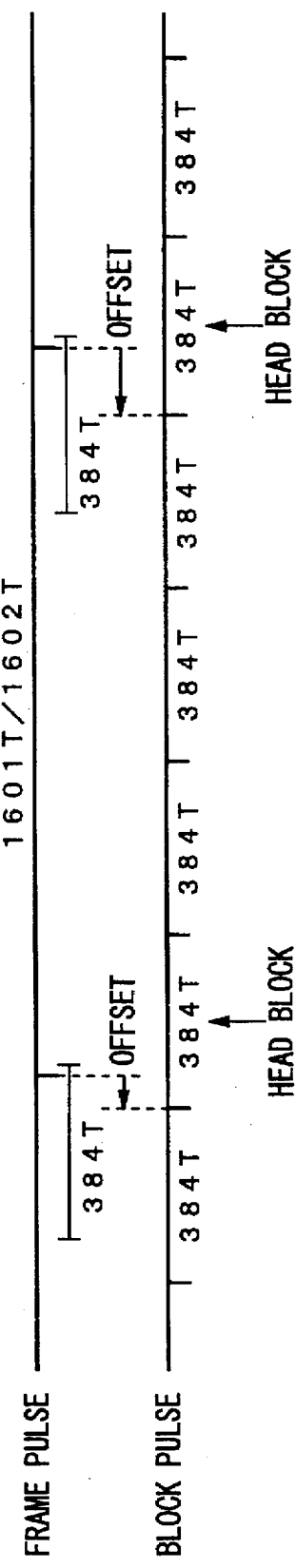

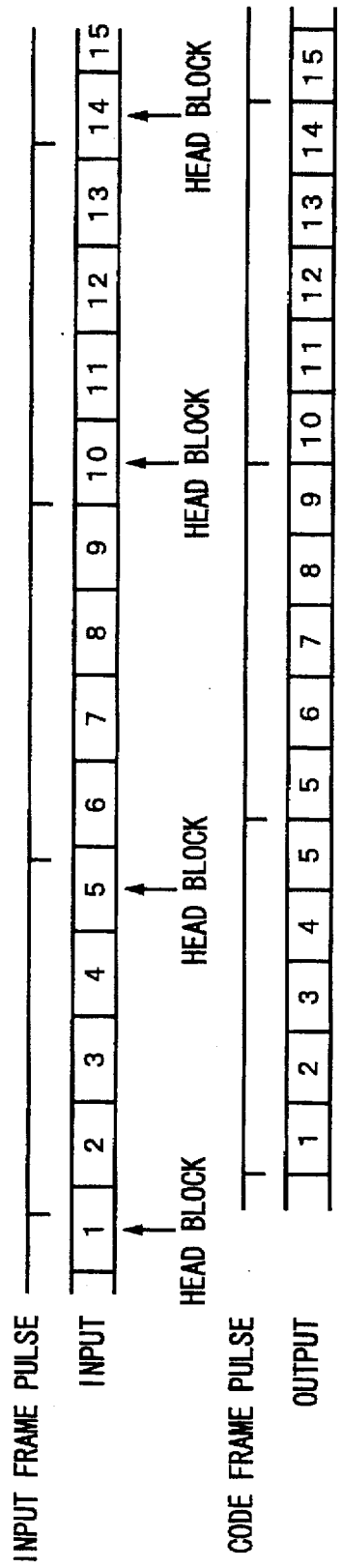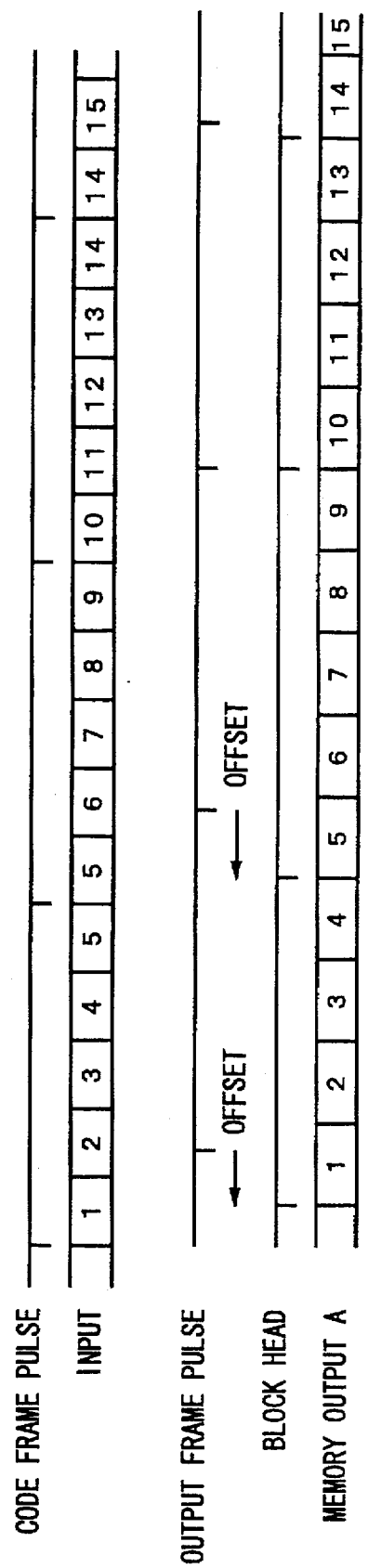

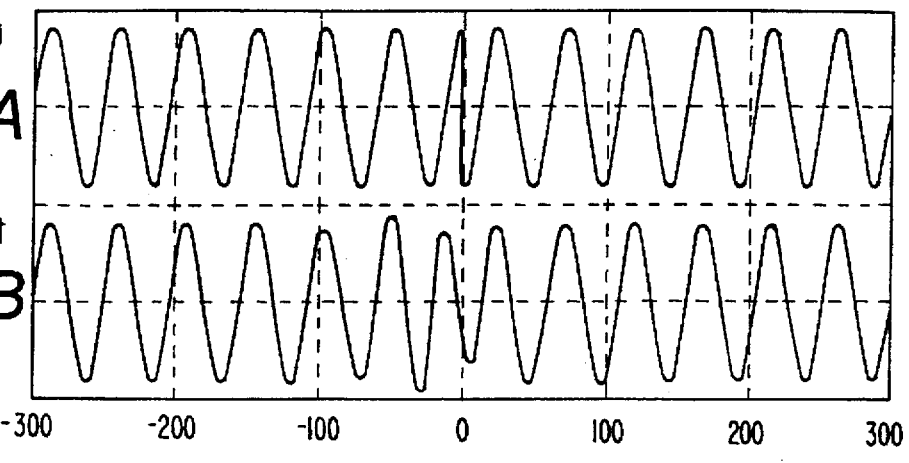
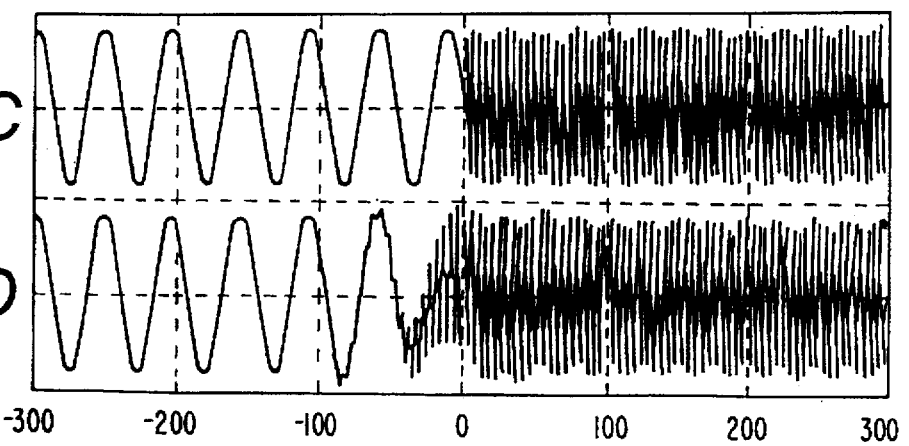

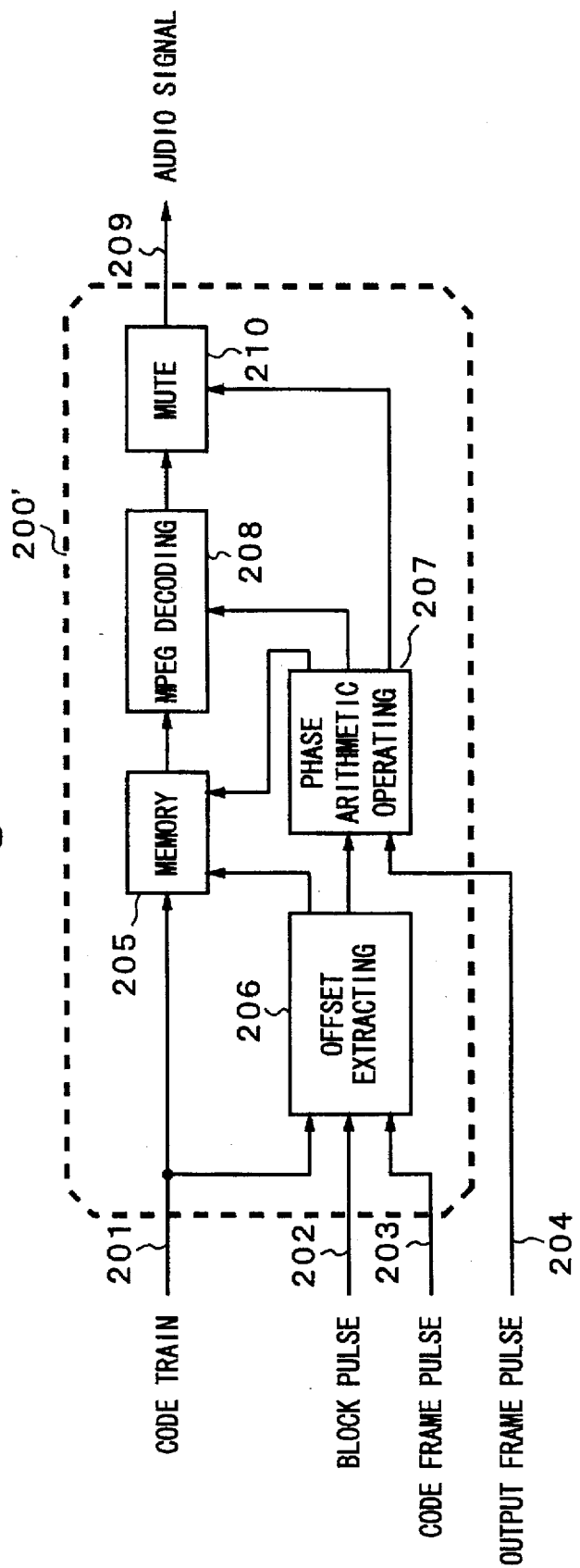

COMPRESSION DATA EDITING APPARATUS

TECHNICAL FIELD

The invention relates to a compression data editing apparatus such that audio data which was data compressed is reproduced on a video frame or field unit basis and, more particularly, to a compression data editing apparatus which can smoothly reproduce without noises at a switching point (editing point) by applying a cross fading when switched (edited) data is reproduced.

BACKGROUND ART

An audio video recording and reproducing apparatus such as to record and reproduce compressed video data and audio data has been put into practical use. In such an apparatus, when an audio signal which was sampled at a sampling frequency of 48 kHz is encoded by the MPEG (Layer I), a block train of a sampling length of 384 is formed. The number of samples of the audio data corresponding to one frame of an NTSC image is equal to 1601 or 1602.

As mentioned above, according to the encoding in which the sample length of 384 is set to a unit encoding block, since the number of encoded blocks in one frame is not equal to an integer number, in order to form a signal train synchronized with the frame, it is necessary to divide the encoded block in the middle of the process. When such a code is switched (edited) on a frame unit basis and is decoded after that, the blocks before and after the switching point (editing point) enter a state in which the data is partially dropped out. In the worst case, namely, when each of the blocks before and after the frame boundary has 383 samples, the data is incomplete in an interval of 766 samples and the intervals each having 256 samples before and after such an interval cannot be decoded.

Therefore, in such an audio video recording and reproducing apparatus, a system such that a ratio between a block period of time as a processing unit of compression audio data and a video frame period of time doesn't show an integer relation has been proposed. FIG. 17B shows a constructional example of an encoding apparatus 100 of such a system. FIG. 18 shows a constructional example of a decoding apparatus 200.

In FIG. 17, an audio signal 101 is a digital signal which was sampled at 48 kHz. A sampling period of 20.8 μsec is set to T hereinafter. The audio signal 101 is supplied to an audio signal input terminal of an MPEG encoding circuit 105 for performing an encoding of the MPEG Layer I.

A block pulse 102 is a pulse signal which is activated every 384T and is supplied to both of one input terminal of the MPEG encoding circuit 105 and one input terminal of a phase comparing circuit 106. An input frame pulse 103 is a pulse signal which is activated every period, namely, 1601T or 1602T in which a frame frequency of 29.97 Hz is synchronized with a sampling frequency of 48 kHz. The input frame pulse 103 is supplied to the other input terminal of the phase comparing circuit 106. A code frame pulse 104 is a signal indicative of an output phase of a code train 109 that is outputted on a frame unit basis from the encoding apparatus and is also a pulse signal which is activated every 1601T or 1602T. The code frame pulse 104 is supplied to a memory circuit 107.

In the encoding apparatus 100, the audio signal 101 supplied to the MPEG encoding apparatus 105 is converted into an MPEG code train and is sequentially written into the memory circuit 107. The block pulse 102 and input frame pulse 103 supplied to the phase comparator 106 are phase compared. Information indicative of a head audio encoded block of each frame unit and information indicative of an offset amount (phase difference) from the frame boundary of the head block are outputted. The information indicative of the head block of the frame is written into the memory circuit 107. The information indicative of the offset amount is supplied to an offset adding circuit 108.

The input audio signal 101 supplied to the MPEG encoding circuit 105 is encoding processed on a block unit basis at a timing of the block pulse 102 which is supplied together with the signal 101. The processed signal is outputted as a code train 109 through the memory circuit 107 and offset adding circuit 108. In the recording apparatus of the video frame unit, therefore, by recording a relative phase (offset) to the input frame pulse 103 of the block pulse 102, an audio video relative phase at the time of inputting and outputting is preserved. After the audio data recorded on a frame unit basis was decoded, when it is outputted, the recorded relative phase indicates an audio output phase for an output reference video frame, so that the audio video relative phase upon inputting and outputting is preserved.

In the memory circuit 107, the MPEG code train is sequentially read out by using the code frame pulse 104 as a reference. The read-out MPEG code train is supplied to the offset adding circuit 108, an offset is added thereto, and the resultant MPEG code train is outputted as a code train 109.

In the decoding apparatus 200 shown in FIG. 18, a code train 201 formed by the above encoding apparatus 100 is sequentially written into a memory circuit 205 and is supplied to an offset extracting circuit 206. An offset value added by the encoding apparatus is extracted from the code train 201 by the offset extracting circuit 206 and is supplied to one input terminal of a phase arithmetic operating circuit 207.

An output frame pulse 204 is supplied to the other input terminal of the phase arithmetic operating circuit 207. In the phase arithmetic operating circuit 207, a signal to decide the phase of the head audio encoded block of each frame is formed by using the output frame pulse 204 as a reference by the offset value extracted from the code train 201 and is supplied to the memory circuit 205. On the basis of the supplied signal, the code train which has previously been written is read out from the memory circuit 205 and is supplied to an MPEG decoding circuit 208. In the MPEG decoding circuit 208, the supplied code train is converted into an audio signal and is outputted as an audio signal output 209 to the outside.

A case where the audio signal is encoded by the encoding apparatus 100 and, when the encoded audio signal is switched or edited on a frame unit basis, the encoded audio signal is decoded by the decoding apparatus 200 will now be described.

Since the encoded block has been divided in the middle of the frame unit, the head pulse of the reproduction block that is formed from the offset recorded in the code train that was switched or edited is not equal to the period of 384T as shown in FIG. 19. The reading operation of the memory 205 is not continuous. As shown in FIG. 19, therefore, a block of incomplete data or a gap occurs at the discontinuous point. In this instance, an output of the MPEG decoding apparatus 208 generates noises. It is, therefore, necessary to mute in such a conventional construction.

FIG. 20 shows a constructional example of a decoding apparatus 200' including a muting circuit 210. In the decoding apparatus 200', the muting circuit 210 is controlled by a signal indicative of a muting timing that is supplied from the phase arithmetic operating circuit 207. The output of the MPEG decoding circuit 208 is muted.

As mentioned above, even in the conventional constructional example, although the generation of noises can be prevented, it is necessary to mute the data and there is a problem such that a deterioration in sound quality occurs due to the muting at the switching point (editing point).

DISCLOSURE OF INVENTION

It is, therefore, an object of the invention to provide a compression audio data editing apparatus which can execute a smooth switching (edition) without noises in an apparatus such that audio data which was data compressed is reproduced on a video frame or field unit basis.

According to the invention, to solve the foregoing subjects, there is provided a compression data editing apparatus characterized by comprising: encoding means for encoding an input audio signal on a unit basis of a block pulse that is inputted, detecting phase difference information between the block pulse and a frame of a video signal, adding the phase difference information to an encoded code train, and outputting a resultant code train; offset extracting means for detecting an offset value from the phase difference information from the code train which is supplied from the encoding means, outputting the offset value, and outputting a repeat pulse when the offset value is out of a range of predetermined values; phase arithmetic operating means for outputting a block head pulse from a frame pulse of the video signal and the offset value which is supplied from the offset extracting means; decoding means for stopping a decoding of the code train which is inputted for a predetermined period of time when the repeat pulse is supplied from the offset extracting means and decoding the code train and outputting the decoded code train as an audio signal when the repeat pulse is not supplied; memory means composed of a first output system which is constructed in a manner such that a writing of the audio signal from the decoding means is started from a position of the block head pulse that is supplied from the phase arithmetic operating means, when the repeat pulse that is supplied from the offset extracting means is inputted, the writing of the audio signal is not performed from the position of the block head pulse, and when the block head pulse is inputted, the written audio signal is read out from a position of the pulse and outputted and a second output system for outputting an audio signal subsequent to the audio signal that is outputted by the first output system from the block head position for a predetermined period of time; and cross fading processing means for performing a cross fading process to the audio signal that is supplied from the memory means for the predetermined period of time from the position of the block head pulse from the phase arithmetic operating means and outputting the audio signal.

According to the invention, to solve the foregoing subjects, there is provided a compression data editing apparatus characterized by comprising: encoding means for encoding an input audio signal on a unit basis of a block pulse which is inputted, detecting phase difference information between the block pulse and a frame pulse of the video signal, adding the phase difference information to an encoded code train, and outputting a resultant code train; offset extracting means for detecting an offset value from the phase difference information from the code train which is supplied from the encoding means and outputting the offset value; phase arithmetic operating means to which the offset value that is supplied from the offset extracting means and the frame pulse of the video signal are inputted and which outputs a block head pulse in the frame; switching means for supplying a switching pulse indicative of position information of an editing point of the video signal; decoding means for stopping a decoding of the code train that is supplied from the encoding means for a predetermined period of time when the switching pulse is inputted, decoding the code train that is inputted when the switching pulse is not inputted, converting the decoded code train into the audio signal, and outputting the audio signal; memory means composed of a first output system which is constructed in a manner such that when the block head pulse which is supplied from the phase arithmetic operating means is inputted, a writing of the audio signal which is outputted from the decoding circuit is started from a position of the pulse, when the switching pulse which is supplied from the switching means is supplied, the writing is not executed for an interval from a block of the code train before an editing point to a point just before a block of the first code train after the editing point, and a reading of the written audio signal is executed from a position where the block head pulse is supplied and a second output system for outputting an audio signal subsequent to the audio signal which is outputted from the first output system for a predetermined period of time from the position where the block head pulse is inputted; and cross fading processing means for executing a cross fading process to the audio signal which is supplied from the memory means for a predetermined period of time from the position of the block head pulse which is supplied from the phase arithmetic operating means and outputting the audio signal.

According to the invention, to solve the foregoing subjects, there is provided a compression data editing apparatus characterized by comprising: encoding means for encoding an input audio signal on a unit basis of a block pulse which is inputted, detecting a phase difference between the block pulse and a frame pulse of the video signal which is inputted, adding the phase difference as phase difference information to an encoded code train, and outputting a resultant code train; offset extracting means for detecting the phase difference information from the code train which is supplied from the encoding means, detecting an offset value, outputting the offset value, and outputting a repeat pulse when the offset value is out of a range of predetermined values; decoding means for stopping a decoding of the code train for a predetermined period of time when the repeat pulse which is supplied from the offset extracting means is inputted and when a block of the code train of the continuous frames having no editing point is supplied from the encoding means, decoding the code train when the block of the code train of discontinuous frames having the editing point is supplied, and decoding the code train and converting into the audio signal and outputting the audio signal when the repeat pulse is not inputted; phase arithmetic operating means to which the offset value that is supplied from the offset extracting means and the frame pulse of the video signal are inputted and which outputs a block head pulse; memory means composed of a first output system which is constructed in a manner such that the block head pulse that is supplied from the phase arithmetic operating means and the repeat pulse that is supplied from the offset extracting means are inputted, a writing of the audio signal that is supplied from the decoding means is executed from a position of the block head pulse, the writing of the continuous audio signal that has no editing point and corresponds to the code train in which the repeat pulse is supplied is not executed for a predetermined period of time, when the block head pulse is inputted, the written audio signal is read out and outputted from the position of the pulse and a second output system for reading out and outputting the audio signal subsequent to the audio signal read out from the first output system for a predetermined period of time from the position of the head block pulse; and cross fading means to which the audio signal that is supplied from the memory means is inputted and which executes a cross fading process for a predetermined period of time from a position of the head block pulse that is supplied from the phase arithmetic operating means and outputs the audio signal.

According to the above construction, the first output system of the phase adjusting means generates the decoded signal to the position where the relative phase information was corrected for the output reference video signal. The second output system of the phase adjusting means generates the decoded signal subsequent to the output of one frame before. Thus, the cross fading can be applied to the switching point (editing point) and the smooth reproduction output can be obtained.

BRIEF DESCRIPTION OF DRAWINGS

FIG. 2 is a schematic diagram showing input and output signals of an MPEG encoding circuit;

FIG. 3 is a schematic diagram for explaining the operation of a phase comparing circuit;

FIG. 4 is a schematic diagram showing the operation of a memory circuit in an encoding apparatus according to the invention;

FIG. 6 is a schematic diagram showing the operation of a memory circuit in the decoding apparatus according to the first embodiment;

FIG. 8 is a schematic diagram showing a comparison of outputs in case of switching an audio signal and in case of decoding the code train including the switching point;

FIG. 20 is a block diagram showing an example of a decoding apparatus including a muting circuit according to the prior art.

BEST MODE FOR CARRYING OUT THE INVENTION

Figure 1:
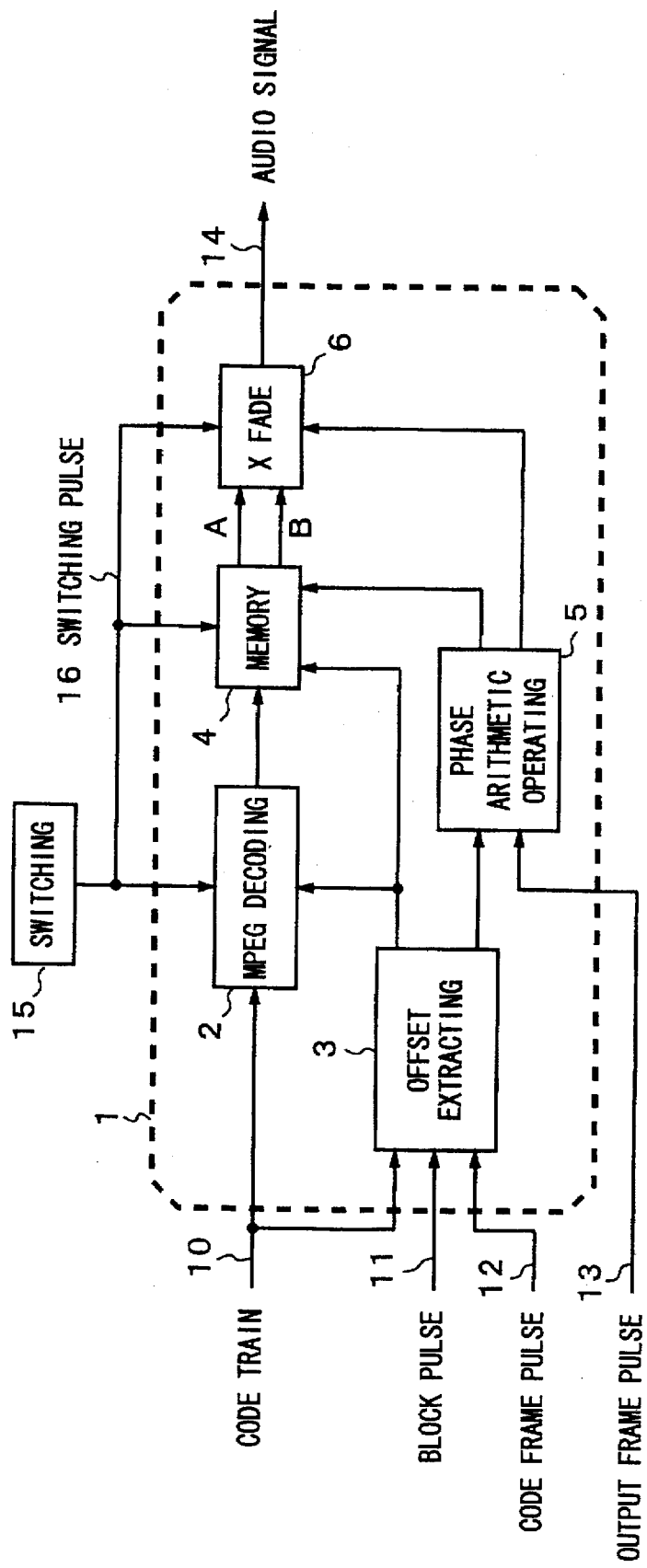
FIG. 1 is a block diagram showing an example of a construction of a decoding apparatus according to the invention.
Figure 17:
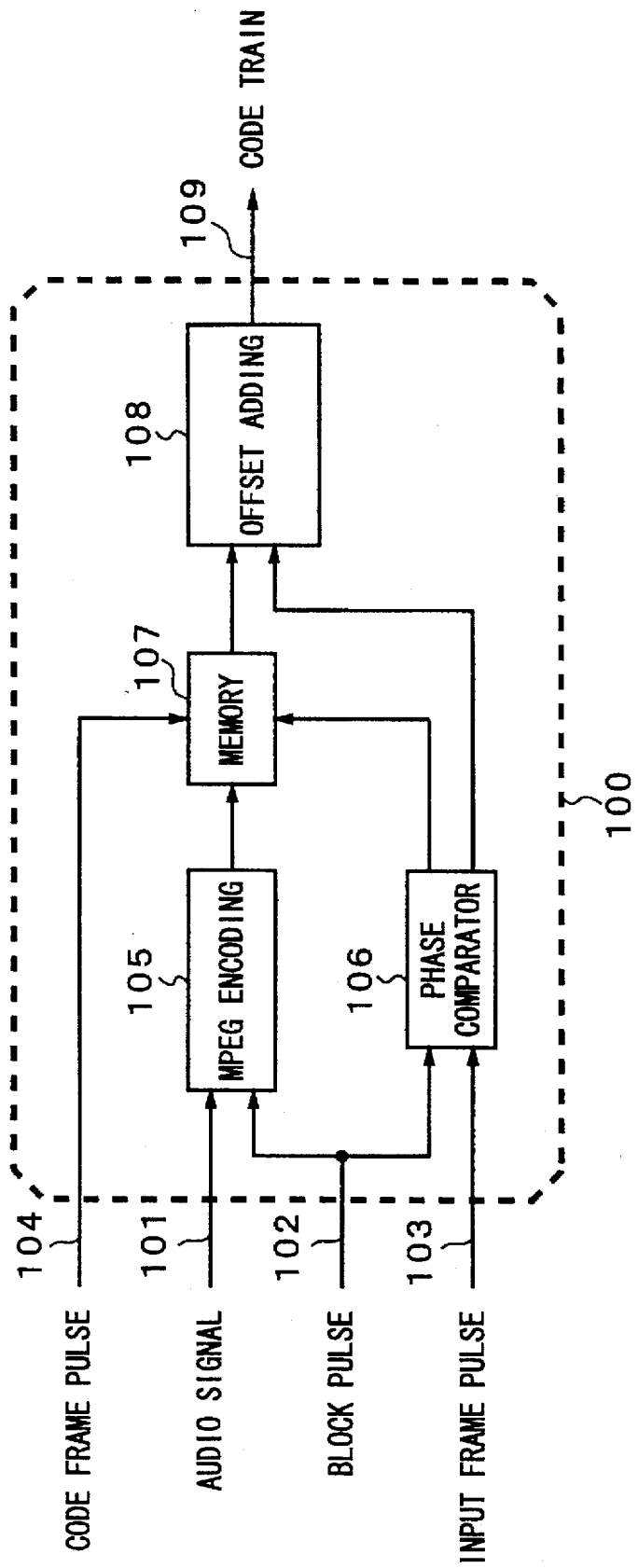
FIG. 17 is a block diagram showing an example of a construction of an encoding apparatus of a system such that a ratio between a block period of time and a video frame period of time doesn't have an integer relation.
Figure 18:
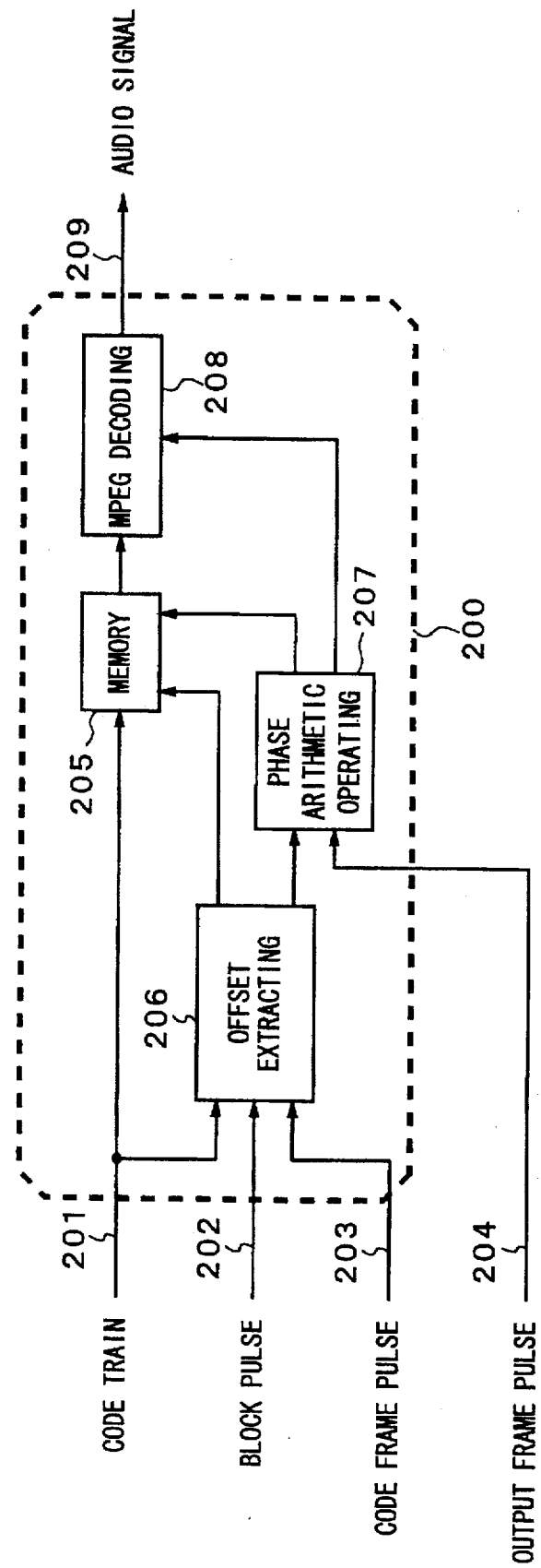
FIG. 18 is a block diagram showing an example of a construction of a conventional decoding apparatus.
Figure 19:
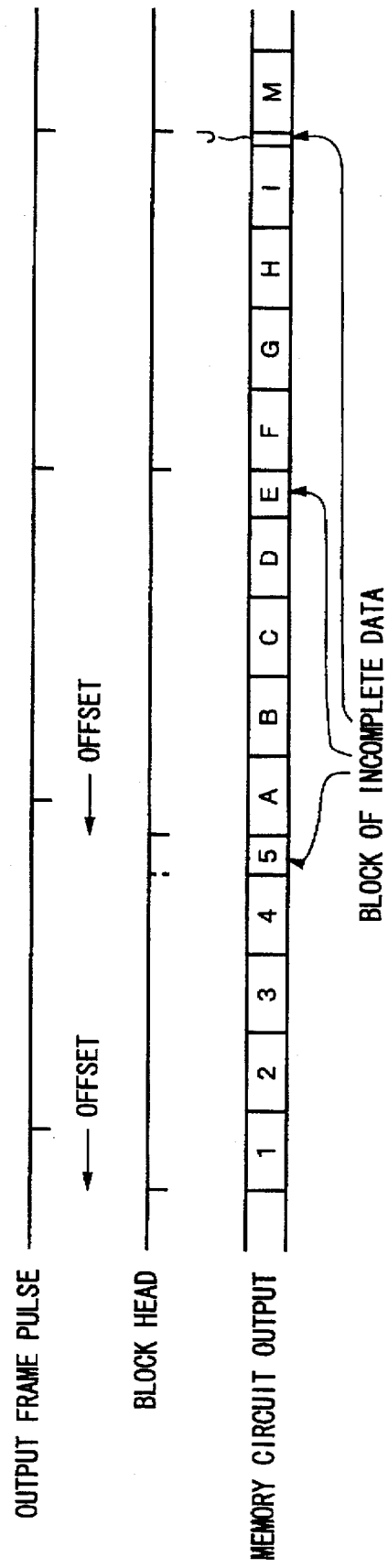
FIG. 19 is a schematic diagram showing an example of a process of a code train which was frame switched.

The first embodiment of the invention will now be described hereinbelow with reference to the drawings. FIG. 1 shows an example of a construction of a decoding apparatus according to the embodiment. In the first embodiment, an example in which data of the MPEG (Layer I) is multiplexed to a video frame of the 525/59.94 system will be described. As an encoding apparatus corresponding to the decoding apparatus, for example, the encoding apparatus 100 according to the prior art shown in FIG. 17 is applied. In the decoding apparatus according to the embodiment, the positions of the MPEG decoding circuit and the memory circuit are exchanged as compared with the construction of the decoding apparatus 200 according to the prior art described above. After the code train was decoded and converted into the audio signal, an output offset process is executed in the memory circuit and a cross fading process is executed in a cross fading circuit.

In the encoding apparatus 100 shown in FIG. 17, the audio signal 101 is supplied to the MPEG encoding circuit 105. The block pulse 102 is also supplied to the MPEG encoding apparatus 105. By the MPEG encoding circuit 105 to which those signals were supplied, as shown in FIG. 2, the MPEG code train as data corresponding to the audio signal 101 in an interval of 384T shown by the block pulse 102 is outputted with a delay of a predetermined amount. This output is supplied to the memory circuit 107. The memory circuit 107 includes a memory in which data is written and a circuit to control the writing and reading operations for the memory.

The foregoing block pulse 102 and input frame pulse 103 are supplied to the phase comparing circuit 106. A head block belonging to the frame is determined by those signals. Namely, as shown in FIG. 3, the intervals each having a width of 384T are set before and after the position of the frame pulse. Since one block pulse certainly exists in the set intervals, the block starting from this pulse is set to the head block of the relevant frame. A signal indicative of the head block in the frame is supplied to the memory circuit 107.

The position of the block pulse is outputted as an offset value. The interval of the width of 384T is set to a range, for example, from −192T to +191T or from −351T to +32T while setting the frame pulse to a center. In an example of FIG. 3, the range from −351T to +32T is set. The offset value is supplied to the offset adding circuit 108.

Data (code train) corresponding to the audio signal which is outputted from the MPEG encoding circuit 105 is written into the memory circuit 107. Five blocks per frame are read out on the basis of the signal indicative of the head block which is outputted from the phase comparing circuit 106 also supplied. Therefore, the code train of the audio data that is outputted from the memory circuit 107 is distributed by a sample length of 320 per frame. FIG. 4 shows a timing for reading out the block. As shown in FIG. 4, an output from the memory circuit 107 has been distributed on a unit basis of the code train of 320T, it is synchronized with the code frame pulse 104. However, when the signal is generated from the memory circuit 107, although four blocks are included in one frame for the code train encoded by the MPEG encoding circuit 105, the fifth block is the head block of the next frame by the head block pulse which is outputted from the phase comparing circuit 106 and also has a possibility such that it is outputted twice. Namely, there are a case where the blocks are sequentially read out and a case where the same block is repeatedly read out twice at the boundary of the frame as shown in the 5th or 14th block in FIG. 4. The code frame pulse 104 is also supplied to the memory circuit 107. The phase at the start of the reading is given by the code frame pulse 104. The data read out from the memory circuit 107 is supplied to the offset adding circuit 108. An offset supplied from the phase comparing circuit 106 is added to the head of each frame or the head of each block.

In the decoding apparatus 1 shown in FIG. 1, a code train 10 is supplied to both of an MPEG decoding circuit 2 and an offset extracting circuit 3. A block pulse 11 and a code frame pulse 12 are also supplied to the offset extracting circuit 3. One output of the offset extracting circuit 3 is supplied to both of the MPEG decoding circuit 2 and a memory circuit 4. Another output of the offset extracting circuit 3 is supplied to one input terminal of a phase arithmetic operating circuit 5. An output frame pulse 13 is supplied to another input terminal of the phase arithmetic operating circuit 5. One output of the phase arithmetic operating circuit 5 is supplied to the memory circuit 4 and another output is supplied to a cross fading circuit 6. An output of the MPEG decoding circuit 2 is supplied to the memory circuit 4. A memory output A and a memory output B of the memory circuit 4 are supplied to the cross fading circuit 6, respectively. An output of the cross fading circuit 6 is outputted as an audio signal 14 to the outside.

Figure 5:
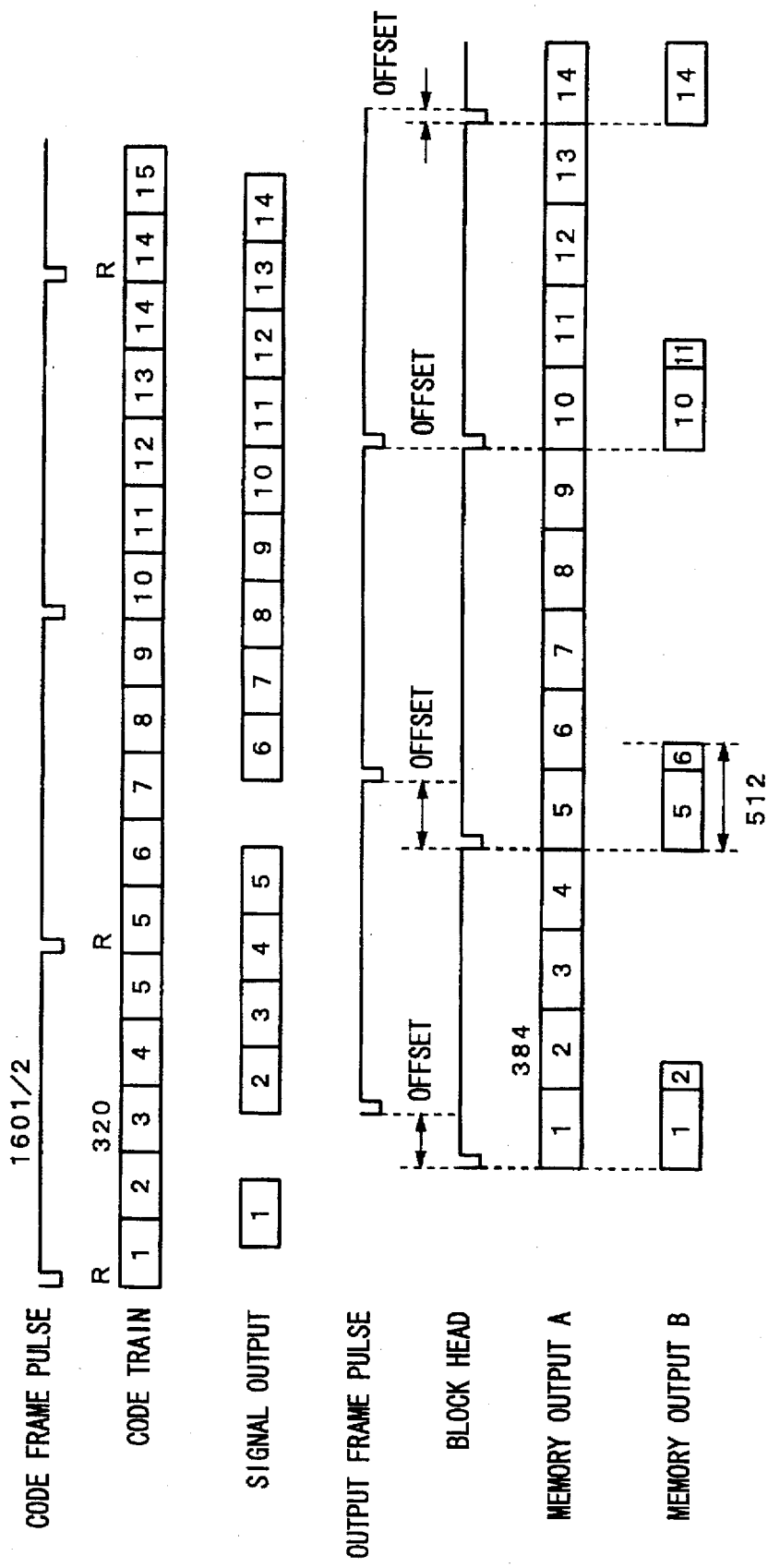
FIG. 5 is a schematic diagram showing an example of each of the input and output signals when an edition is not performed in the decoding apparatus of the first embodiment.

The code train 10 supplied to the MPEG decoding circuit 2 is delayed by a predetermined amount and is subjected to a decoding to convert into an audio signal (decoded output). FIG. 5 shows an example of each of input and output signals which are not edited in the decoding apparatus 1. Upon decoding, the operation of the MPEG decoding circuit 2 is temporarily stopped for the repetitive block. In the example, the fifth block is repeatedly recorded upon encoding. It can be detected from the offset value which is obtained by the offset extracting circuit 3. Namely, when the extracted offset value is out of a range of predetermined values, namely, ±32 in the example, a repeat pulse is generated by the offset extracting circuit 3. The repeat pulse is supplied to the MPEG decoding circuit 2.

When the repeat pulse is supplied, in the MPEG decoding circuit 2, a decoding process is temporarily stopped in the fifth block which corresponds to the pulse and is a code block recorded at the second time. The process is started when the next sixth block is inputted.

The temporary stop of the decoding process becomes a process which is necessary for the decoding process when the data near the boundary of the blocks is repeatedly recorded. In the MPEG decoding circuit 2, the supplied code train 10 is supplied to, for example, a synthesis filter of 512 taps in the MPEG decoding circuit 2 and is converted into the audio signal. Therefore, the data of 256 samples near the boundary of the adjacent blocks is mutually influenced, so that the correct audio signal is outputted.

As mentioned above, therefore, while the fifth block of the code train 10 which was repeatedly recorded is supplied to the synthesis filter in the MPEG decoding circuit 2, by temporarily stopping the decoding process, the code train data of the 5th and 6th blocks are apparently continuously processed and the data near the boundary is correctly decoded.

As a method of correctly decoding the data near the boundary other than the temporary stop of the decoding of the code train, there is a method of performing a combination of an exchange of the input code trains and a deletion of the output audio signal. The decoding is not stopped but executed in the block in which the repeat pulse is outputted (repeat flag is set) by the offset extracting circuit 3 and the output audio signal corresponding to it is deleted as invalid data in the memory circuit 4 at the post stage. Further, the code train which is inputted in the block next to the block in which the repeat pulse is outputted by the offset extracting circuit 3 is exchanged to the code train of the block in which the repeat pulse is outputted by the offset extracting circuit 3 and the decoding process is executed.

In FIG. 5, a process in this instance will now be described. The fifth block of the decoded output is inputted to the MPEG decoding circuit 21 in correspondence to the code trains of the 3rd, 4th, and 5th blocks. Subsequently, the code train (the 5th block in which "R" of the code train was added: referred to as a fifth "R" block) in which the repeat flag has been set to "1" is inputted to the MPEG decoding circuit 2. In this instance, the 5'th block (not shown) of the decoded output corresponding to the 5th "R" block is outputted from the MPEG decoding circuit 2 without stopping the process.

Further, when the code train 6 is inputted to the MPEG decoding circuit 2, the 5th "R" block and the 6th block of the code train are exchanged, the decoding process is executed, and the 6th block of the corresponding decoding output is outputted. In the memory circuit 4 at the post stage, by again writing the 6th block of the decoded output onto the 5'th block of the decoded output in which the repeat flag has been set to "1", the code train data of the 5th and 6th blocks is continuously processed in a manner similar to the temporary stop of the decoding of the code train and the data near the boundary is correctly decoded.

As shown in the decoded output of FIG. 5, the output of the MPEG decoding circuit 2 is an output in which the blocks are dropped out. This output is supplied to the memory circuit 4. The output of the offset extracting circuit 3 is also supplied to the phase arithmetic operating circuit 3 together with the output frame pulse 13. In the phase arithmetic operating circuit 5, an arithmetic operation is executed on the basis of those signals and a write head pulse with a delay that is required for the process by the MPEG decoding circuit 2 from the code frame pulse 12 is outputted. The outputted head pulse and the repeat pulse detected from the offset extracting circuit 3 are supplied to the memory circuit 4.

A processing clock for the writing process of the MPEG decoding circuit 2 and memory circuit 4 is a frequency for treating the data (1920 samples) of five blocks per frame. A processing clock for the reading process of the memory circuit 4 is a frequency for treating data of 1602/1601 samples per frame. The memory circuit 4 has a time base function, so that the decoded output which is intermittently supplied is time base converted to the continuous audio signal.

In the memory circuit 4, the writing of the decoded output to the memory circuit 4 is started from the position of the write head pulse supplied from the phase arithmetic operating circuit 5. In this instance, in the frame in which the repeat pulse is supplied to the memory circuit 4, the head block is not written but the writing is executed from the second block. Therefore, only the blocks shown in the decoded output in FIG. 5 are written into the memory of the memory circuit 4.

The reading operation from the memory of the memory circuit 4 is divided into two systems of a read A and a read B. The read-out data is outputted as a memory output A and a memory output B, respectively. In the read A, the reading operation is executed from the position of the block head pulse which is formed from the output frame pulse and the offset. A head read address is corrected every block. In the continuous signal, the corrected read address is not different from that before correction and the continuous data is read out and outputted as a memory output A. FIG. 6 shows the operation of the memory circuit 4 in the decoding apparatus 1. In this manner, the address of the head block is corrected by the offset and is outputted.

From the read B, a memory output is derived for only a cross fading period of time (512 samples in the example of FIG. 5) from the position of the block head. In the example of FIG. 5, the memory output A and memory output B are the same data. The memory outputs A and B are supplied to the cross fading circuit 6 and are cross fading processed and, after that, the resultant signal is generated as an audio signal 14. In the example of FIG. 6, the outputted audio signal 14 becomes the same data as that of the memory output A.

Figure 7:
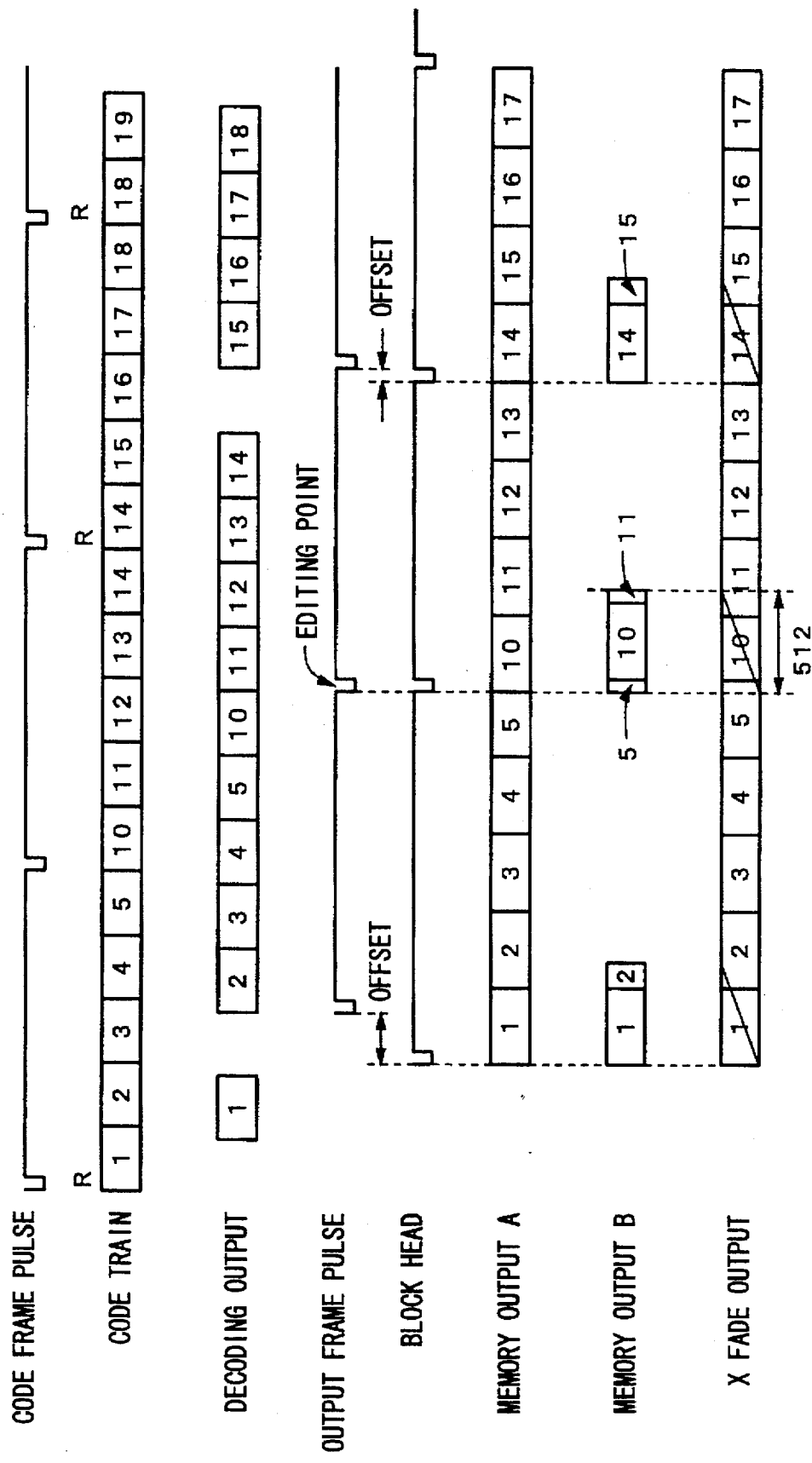
FIG. 7 is a schematic diagram showing a cross fading process at a switching point (editing point) of a code train.

FIG. 7 shows a cross fading process at the switching point (editing point) of the code train. In this example, the code trains of the 5th to 9th blocks are extinguished by the switching (edition). As described in the example of FIG. 5, while the block of the code train which was repeatedly recorded are supplied to the synthesis filter, the decoding process of the code train which is inputted is temporarily stopped. Thus, the output of the MPEG decoding circuit 2 is an output in which the blocks are dropped out as shown in a decoded output in FIG. 7 and this signal is supplied to the memory circuit 4.

In a manner similar to FIG. 5, the writing of the decoded output into the memory of the memory circuit 4 is started from the position of the write head pulse. In this instance, in the frame in which the repeat flag has been set to "1", the writing of the head block is not executed but the writing is executed from the second block. Therefore, only the blocks shown in the decoded output in FIG. 7 are stored into the memory.

In the example shown in FIG. 7, the code blocks 5 and 10 are neighboring at the switching point (editing point). In the audio signal, such a signal at the switching point becomes pop noises including harmonic components. However, in the subband encoding/decoding represented by the MPEG, the samples near the boundary of the adjacent blocks are mutually influenced due to an effect of the synthesis filter in the decoding step and a smooth output is derived.

FIG. 8 shows a comparison between outputs in case of switching the audio signal and in case of decoding the code train including the switching point. FIGS. 8A and 8B show signals at the switching point of the audio signals of frequencies which are close. FIG. 8A shows the signal at the switching point in the general audio signal. FIG. 8B shows the signal at the switching point in the subband decoding. In the diagrams, the position of 0 on an axis of abscissa corresponds to the switching point. FIGS. 8C and 8D show cases where a difference between the frequencies of two signals to be switched is large. Similarly, FIG. 8C shows the signal at the switching point in the general audio signal and FIG. 8D shows the signal at the switching point in the subband decoding. As mentioned above, a smooth output including no noise component even at the switching point (editing point) is derived due to an effect of the synthesis filter of the MPEG.

The reading operation from the memory for the decoded output written in the memory from the position of the write head pulse is separated into two systems of the read A and read B. In the read A, the reading operation is performed from the position of the block head pulse which is formed from the output frame pulse and the offset and the head read address is corrected every block. Therefore, as shown in FIG. 7, the position portion of the latter half of the 5th block is dropped out at the position of the block head pulse corresponding to the block switched by the switching (edition) and the head of the 10th block is continuously outputted.

In the read B, the decoded output is generated for only the cross fading period of time (512 samples in the example of FIG. 7) from the position of the block head. The data subsequent to the data read out by the read A at a timing just before the block head is read out. Namely, the decoded output of the latter half portion of the 5th block which was dropped out in the read A is read out. Subsequently, the decoded output of the head of the 10th block is read out and generated as a memory output B.

Both of the memory outputs A and B are supplied to the cross fading circuit 6 and are cross fading processed. The resultant signal is outputted as an audio signal 14. The cross fading process is executed for the cross fading period of time (512 samples in the example of FIG. 7) from the position of the block head pulse. Since the memory outputs A and B are the same signal at points other than the switching point (editing point), the output signal is not changed by the cross fading process. The output signal which was cross fading processed is shown as an Xfade output in FIG. 7. A cross fading gain is shown as an oblique line here. Since both of the memory outputs A and B are smooth signals due to the effect of the synthesis filter, an output without any noise can be obtained as a cross fading output.

Figure 9:
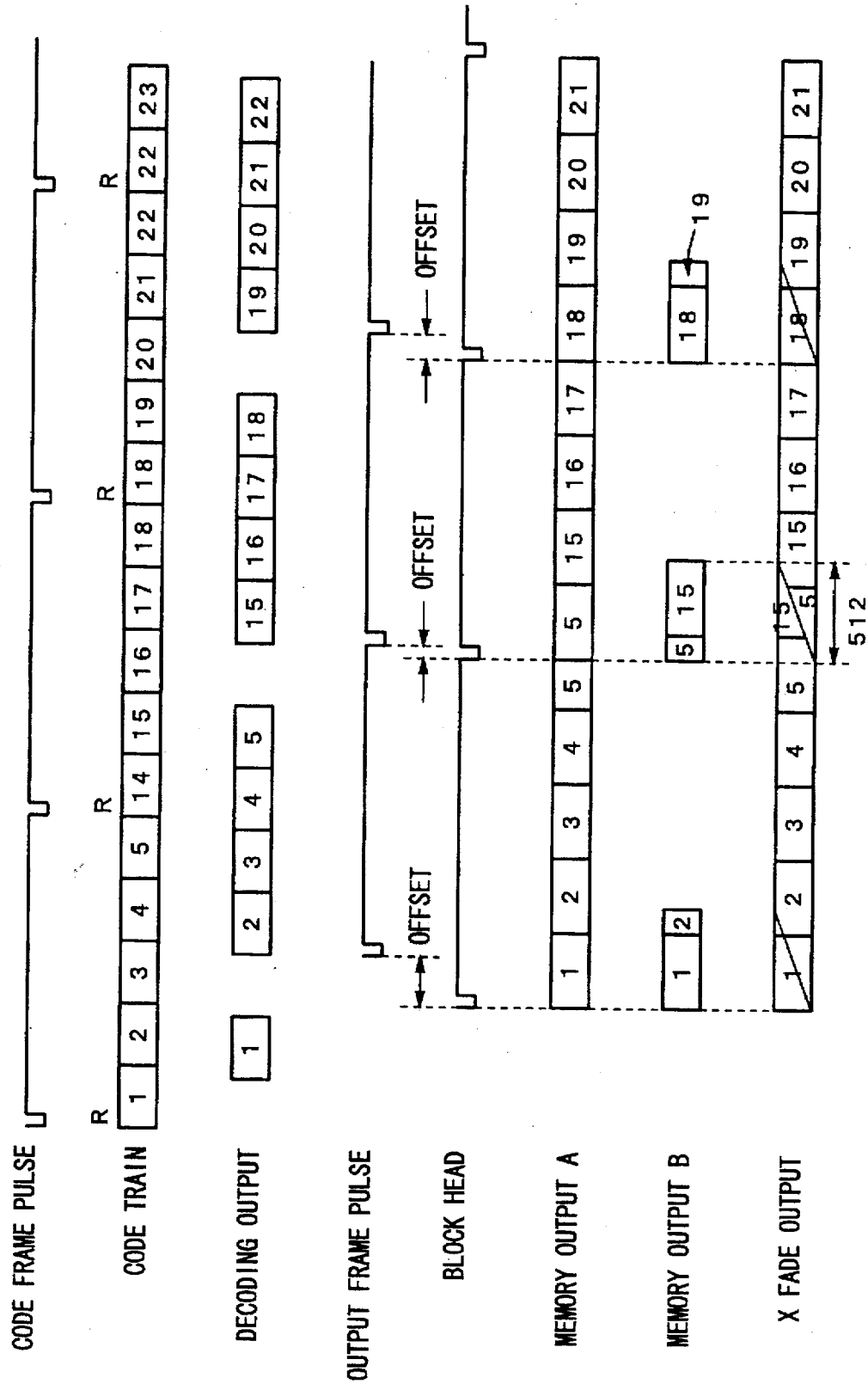
FIG. 9 is a schematic diagram showing an example in which the code trains of the 5th to 14th blocks are extinguished by a switching (edition) in the first embodiment.

FIG. 9 shows an example in which the code trains of the 5th to 14th blocks are extinguished due to the switching (edition). In this case as well, by executing processes similar to those in FIG. 7 mentioned above, an output without any noise is derived as a cross fading output.

Figure 10:
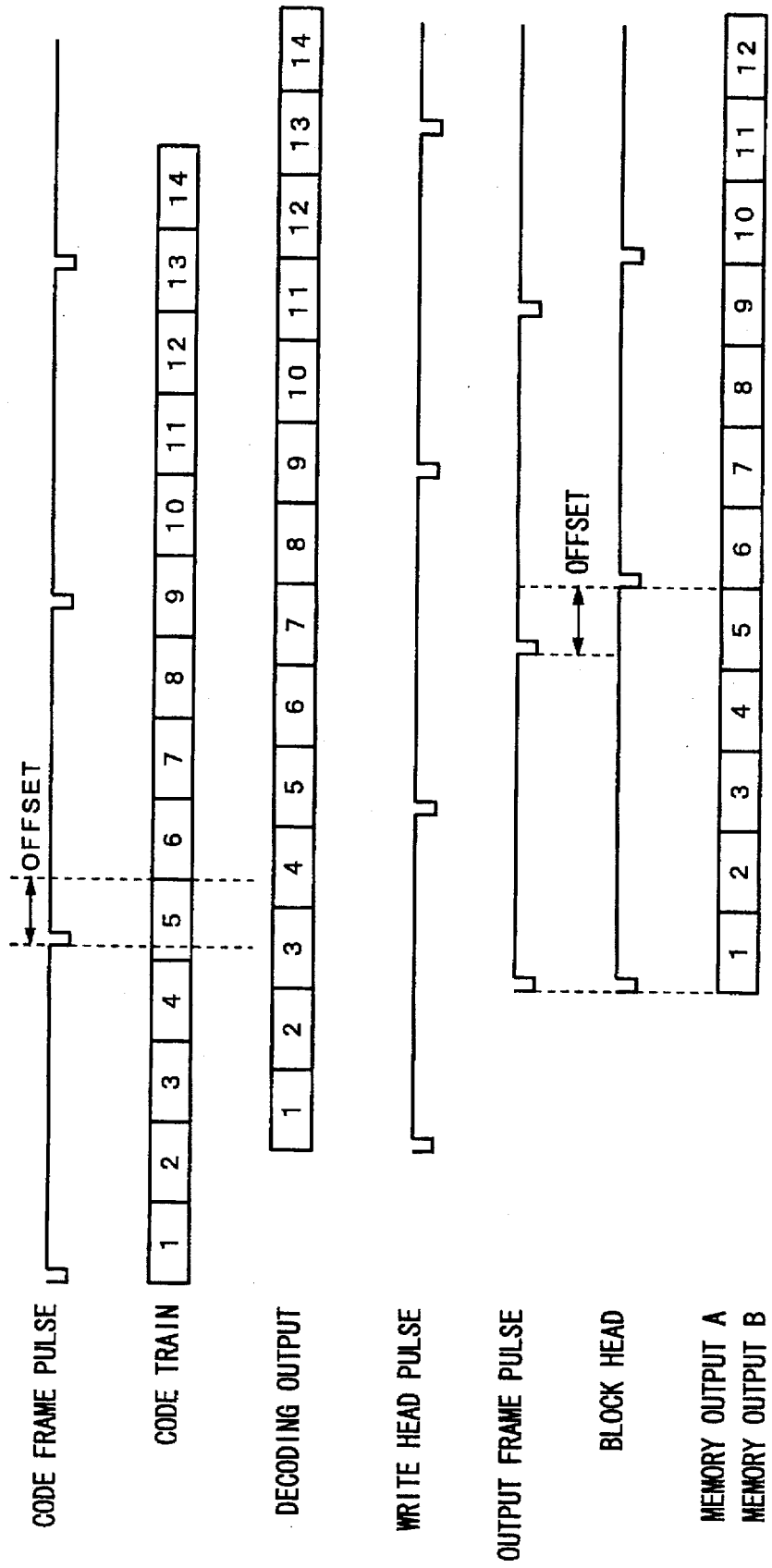
FIG. 10 is a schematic diagram showing an example in which data of the MPEG (Layer I) is multiplexed to a video frame of the 525/59.94 system in the second embodiment.
Figure 11:
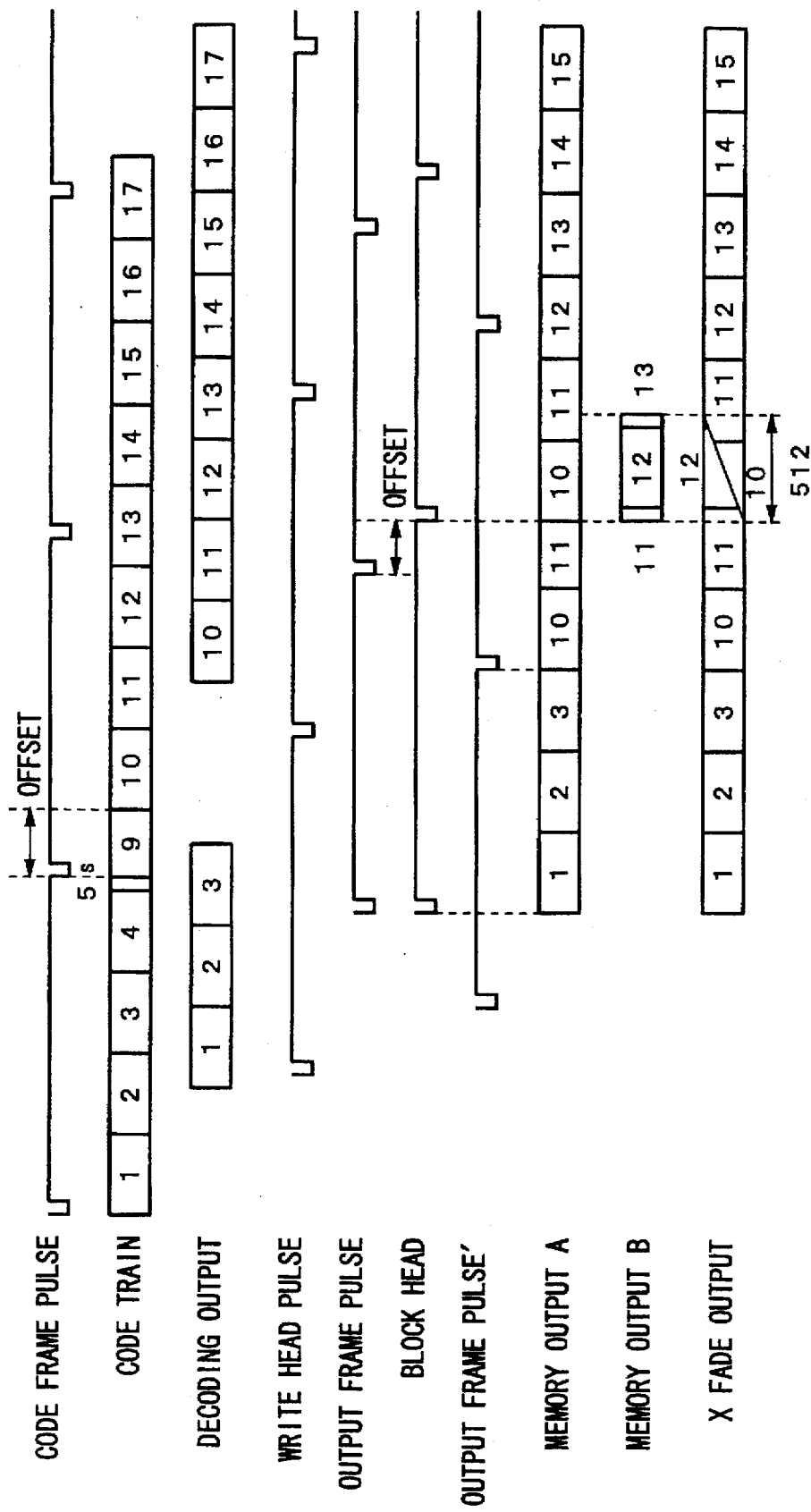
FIG. 11 is a diagram showing an example in which the code trains of parts of the 6th to 8th blocks and the 5th and 9th blocks are extinguished by a switching (edition) in the second embodiment.

The second embodiment of the invention will now be described with reference to the drawings. FIGS. 10 and 11 show examples in which data of the MPEG (Layer I) is multiplexed to a video frame of the 525/59.94 system in a manner similar to the first embodiment. In the example, after the audio signal was encoded, data of 1601 or 1602 samples per frame is recorded. The offset value is recorded every frame. When the code frame pulse and the code train have the same phase, the offset value is equal to 0. When the code train doesn't have the same phase as that of the frame pulse, an interval between the head of the block just after the frame pulse and the frame pulse is set to the offset. In FIG. 10, the offset of the first frame is equal to 0 and the offset of the second frame is set to an interval shown by arrows in the diagram.

In the embodiment as well, the decoding apparatus 1 shown in FIG. 1 is used in a manner similar to the foregoing first embodiment. The code train 10 supplied to the MPEG decoding circuit 2 is delayed by a predetermined amount and, after that, is converted into the audio signal (decoded output) and supplied to the memory circuit 4. The write head pulse formed by delaying the code frame pulse 12 by the offset extracting circuit 3 is also supplied to the memory circuit 4. The writing of the decoded output into the memory of the memory circuit 4 is started from the position of the write head pulse supplied.

The reading operation from the memory of the memory circuit 4 is divided into two systems of the read A and read B. The reading of the decoded output written in the memory circuit 4 from the read A is performed from the position of the block head pulse which is formed by the phase arithmetic operating circuit 5 from the output frame pulse 13 and the offset extracted by the offset extracting circuit 3. The head read address is corrected every block. In the continuous signal, the corrected read address is not different from the address before the correction. The continuous data is read out and generated as a memory output A. By a switching device 15 in the editing apparatus, a switching flag signal 16 indicating in which block the switching was performed is supplied to the MPEG decoding circuit 2, memory circuit 4, and cross fading circuit 6 in the decoding apparatus 1, so that a switching flag can be set into the block to be edited by the switching (edition). In the read B, when the switching flag is not detected in the memory circuit 4, 0 is outputted. As mentioned above, when the switching flag is not detected, the cross fading process is not executed in the cross fading circuit 6 but the memory output A is directly generated as an audio signal 14.

FIG. 11 shows the cross fading process at the switching point (editing point) of the code train 10. In the example, as shown in FIG. 11, the code trains of parts of the 6th to 8th blocks and the 5th and 9th blocks are extinguished by the switching (edition).

In this case as well, in a manner similar to the first embodiment mentioned above, the decoding process is temporarily stopped. When the switching flag is detected in the MPEG decoding circuit 2, the decoding process is temporarily stopped for a period of time until the first block after, in this example, the fourth and subsequent blocks of the frame before switching, namely, before the editing point were switched is supplied to the synthesis filter. Thus, the output of the MPEG decoding circuit 2 is an output in which the blocks are dropped out as shown in the decoded output in FIG. 11 and is supplied to the memory circuit 4.

In a manner similar to FIG. 10, the writing of the decoded output into the memory of the memory circuit 4 is started from the position of the write head pulse which is supplied to the memory circuit 4. In this instance, in the frame in which the switching flag has been set to "1", the writing until just before the first block after, in this example, the fourth and subsequent blocks of the frame before switching were switched is not executed. The writing is executed from the head of the first block after completion of the switching. Therefore, only the blocks shown in the decoded output in FIG. 11 is written into the memory of the memory circuit 4.

The reading operation from the memory of the memory circuit 4 is divided into two systems of the read A and read B. The reading of the decoded output written in the memory circuit 4 from the read A is performed from the position of the block head pulse which is formed by the phase arithmetic operating circuit 5 from the output frame pulse 13 and the offset extracted by the offset extracting circuit 3. The head read address is corrected every block. Therefore, as shown in FIG. 11, the latter half position portion of the 11th block is dropped out at the position of the block head pulse corresponding to the block switched by the switching (edition) and the head of the 10th block is subsequently outputted. Further, when the switching flag is set to "1", the switching is executed from the position of an output frame pulse' in which the output frame pulse 13 was delayed by a time corresponding to three blocks. The block just after is generated. Thus, the read A from the memory is generated as a memory output A shown in FIG. 10.

As shown in FIG. 11, at the switching point (editing point), the 3rd and 10th blocks as code blocks are neighboring. In this instance as well, in a manner similar to the foregoing first embodiment, the samples near the boundary of the adjacent blocks are mutually influenced due to the effect of the synthesis filter in the decoding step and a smooth output is derived.

The read B is generated for only the cross fading period of time (512 samples in the example of FIG. 11) from the position of the block head. Just before the block head, the data subsequent to the data read out by the read A is read out. Namely, the latter half portion of the 11th block which was dropped out in the read A is read out and the head of the 12th block is subsequently outputted.

The memory outputs A and B are supplied to the cross fading circuit 6 and cross fading processed. The resultant signal is generated as an audio signal 14. The cross fading process is executed only when the switching flag is detected and is performed for the cross fading period of time (512 samples in the example of the diagram) from the position of the block head pulse supplied from the phase arithmetic operating circuit 5 to the cross fading circuit 6. The audio signal 14 which was cross fading processed is shown as an Xfade output in FIG. 11. A cross fading gain is shown by an oblique line. Since both of the memory outputs A and B are smooth signals due to the effect of the synthesis filter, an output without any noise can be derived as a cross fading output.

Figure 12:
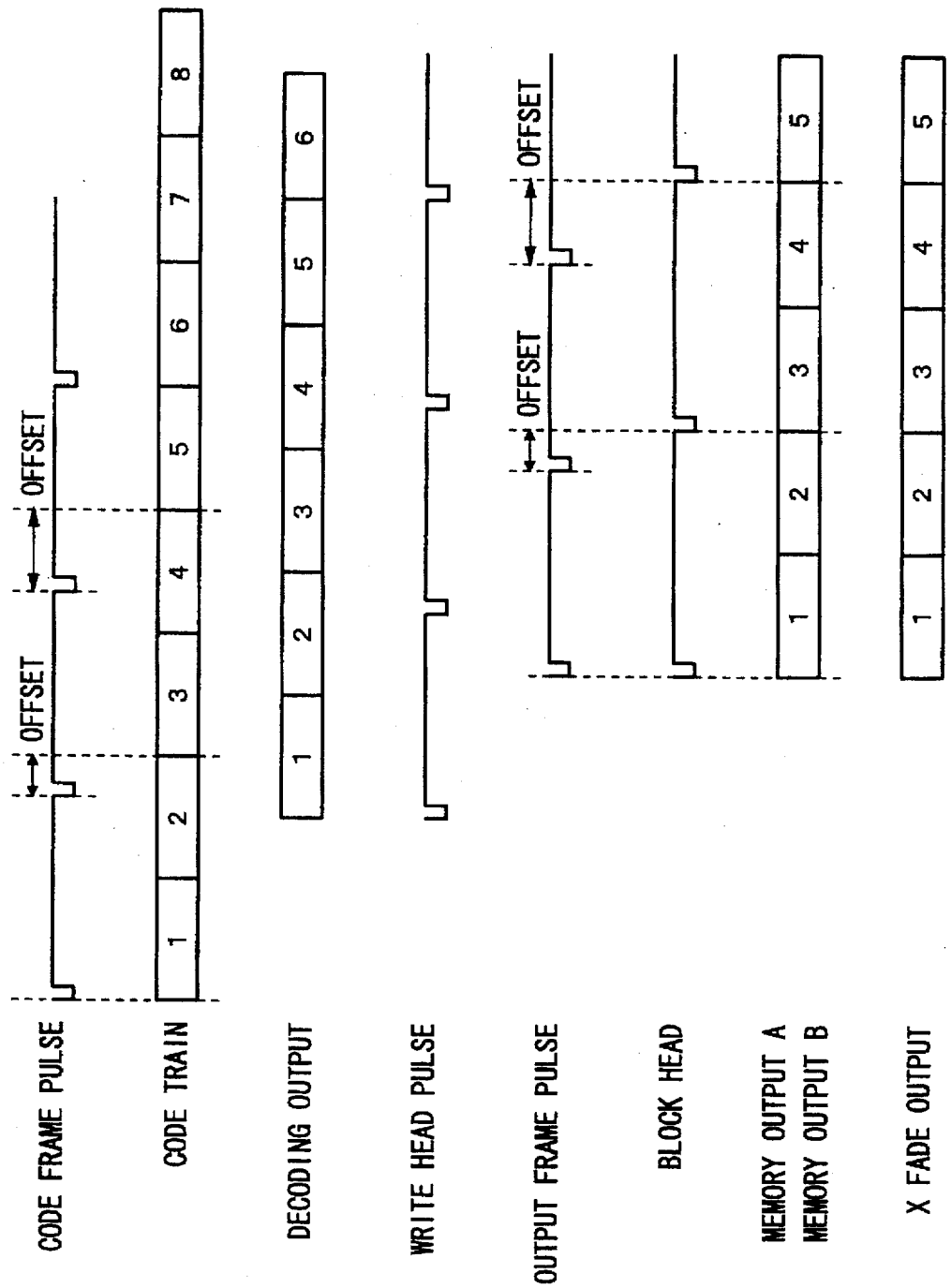
FIG. 12 is a schematic diagram showing an example in which data of the MPEG (Layer II) is multiplexed to a video frame of the 625/50 system in the third embodiment.
Figure 13:
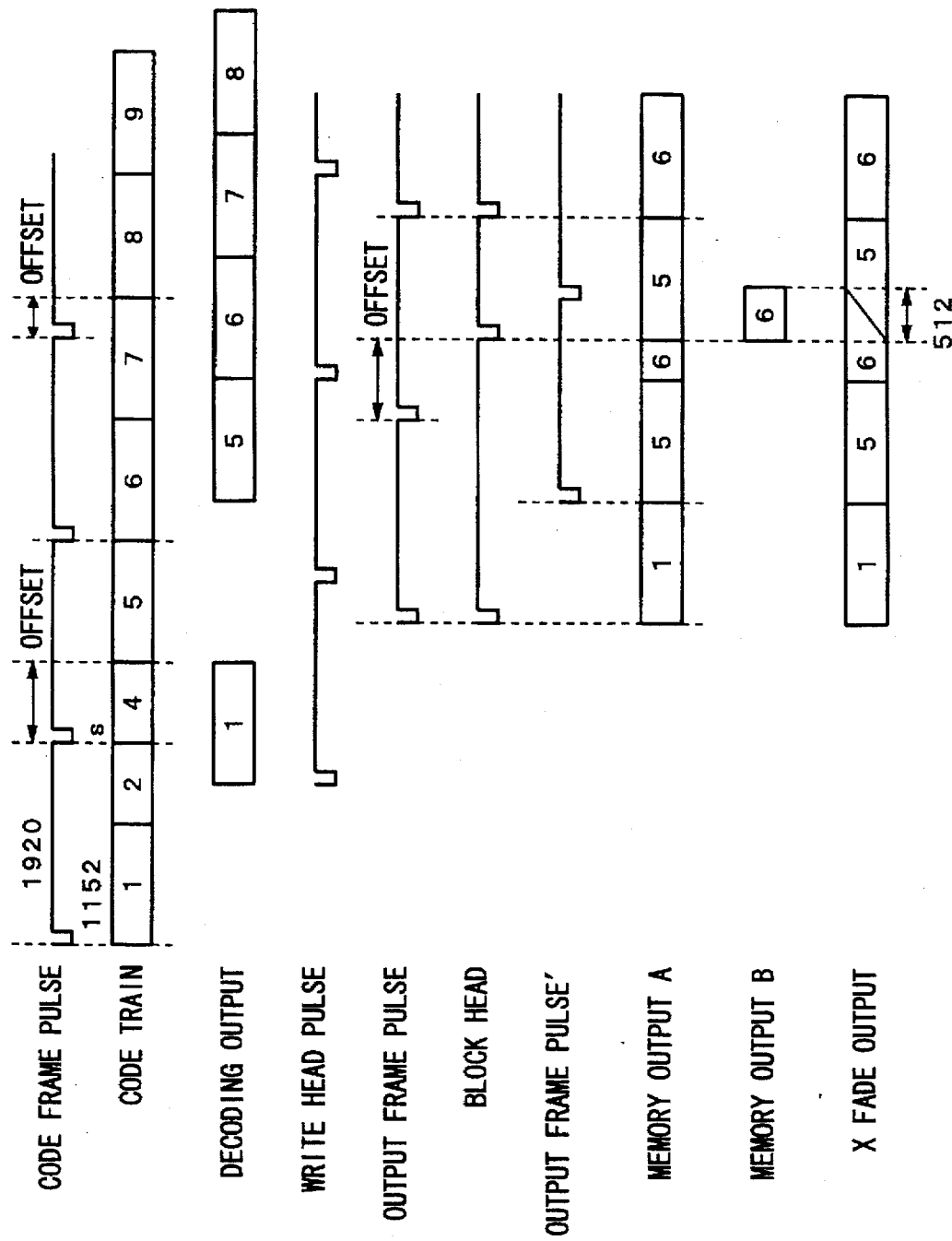
FIG. 13 is a schematic diagram showing an example in which the code trains of the 3rd and a part of the 2nd and 4th blocks are extinguished by the switching (edition) in the third embodiment.

The third embodiment of the invention will now be described with reference to the drawings. FIGS. 12 and 13 show examples in which the data of the MPEG (Layer II) is multiplexed to a video frame of the 625/50 system. In the Layer II, the block length is set to 1152 samples.

In the example, after the audio signal was encoded, the data of 1920 samples per frame is recorded and the offset value is recorded every frame. When the code frame pulse and the code train have the same phase, the offset value is equal to 0. When the code train doesn't have the same phase as that of the frame pulse, the head of the block just after the frame pulse and an interval of the frame pulse is set to the offset. In FIG. 12, the offset of the first frame is equal to 0 and the offset of the second frame is set to an interval shown by arrows in the diagram.

In the embodiment as well, the decoding apparatus 1 shown in FIG. 1 is used in a manner similar to the foregoing first and second embodiments. The code train 10 supplied to the MPEG decoding circuit 2 is delayed by a predetermined amount and, after that, it is converted into the audio signal (decoded output) and supplied to the memory circuit 4. The write head pulse in which the code frame pulse 12 was delayed and formed by the offset extracting circuit 3 is also supplied to the memory circuit 4. From the position of the write head pulse supplied, the writing of the decoded output into the memory of the memory circuit 4 is started.

The reading operation from the memory of the memory circuit 4 is divided into two systems of the read A and read B. The reading of the decoded output written in the memory circuit 4 from the read A is performed from the position of the block head pulse which is formed by the phase arithmetic operating circuit 5 from the output frame pulse 13 and the offset extracted by the offset extracting circuit 3. The head read address is corrected every block. In the continuous signal, the corrected read address is not different from that before correction. The continuous data is read out and generated as a memory output A. By the switching device 15 in the editing apparatus, the switching flag signal 16 indicating in which block the switching is performed is supplied to the MPEG decoding circuit 2, memory circuit 4, and cross fading circuit 6 of the decoding apparatus 1. Therefore, the switching flag can be set into the block to be edited by the switching (edition). In the read B, when the switching flag is not detected in the memory circuit 4, 0 is outputted. As mentioned above, when the switching flag is not detected, the cross fading process is not performed in the cross fading circuit 6 and the read A is directly generated as an audio signal 14.

FIG. 13 shows the cross fading process at the switching point (editing point) of the code train 10. In this example, as shown in FIG. 13, the code trains of the 3rd and a part of the 2nd and 4th blocks are extinguished by the switching (edition).

In this case as well, the decoding process is temporarily stopped in a manner similar to the foregoing first and second embodiments. When the switching flag is detected by the MPEG decoding circuit 2, the decoding process is temporarily stopped for a period of time until the first block after, in this example, the fourth and subsequent blocks of the frame before switching, namely, before the editing point were switched is supplied to a synthesis filter, so that the output of the MPEG decoding circuit 2 is an output in which the blocks are dropped out as shown in a decoded output of FIG. 15 and is inputted to the memory circuit 4.

In a manner similar to FIG. 12, the writing of the decoded output into the memory is started from the position of the write head pulse. In this instance, in the frame in which the switching flag has been set to "1", the writing until just before the first block after the second and subsequent blocks of the frame before switching were switched is not executed. The writing is executed from the first block. Therefore, only the blocks shown in the decoded output of FIG. 13 is fetched into the memory of the memory circuit 4.

The reading operation from the memory of the memory circuit 4 is divided into two systems of the read A and read B. The reading of the decoded output written in the memory circuit from the read A is performed from the position of the block head pulse which is formed by the phase arithmetic operating circuit 5 from the output frame pulse 13 and the offset extracted by the offset extracting circuit 3. The head read address is corrected every block. Therefore, as shown in FIG. 13, the latter half position portion of the 6th block is dropped out at the position of the block head pulse corresponding to the blocks switched by the switching (edition) and the head of the 5th block is subsequently outputted. Further, when the switching flag is set to "1", the switching is performed from the position of the output frame pulse' in which the output frame pulse 13 was delayed by a time corresponding to one block and the block just after is generated. Thus, the read A from the memory is generated as a memory output A shown in FIG. 13.

As shown in FIG. 13, at the switching point (editing point), the 1st and 5th blocks as code blocks are neighboring. In this instance as well, in a manner similar to the foregoing first and second embodiments, the samples near the boundary of the adjacent blocks are mutually influenced due to an effect of the synthesis filter in the decoding step and a smooth output is derived.

The read B is outputted for only the cross fading period of time (512 samples in the example of FIG. 13) from the position of the block head. Just before the block head, the data subsequent to the data read out by the read A is read out. Namely, the latter half portion of the block 6 which was dropped in the read A is read out and generated as a memory output B.

The memory outputs A and B are supplied to the cross fading circuit 6 and are cross fading processed. The resultant signal is generated as an audio signal 14. The cross fading process is executed only when the switching flag is detected and is executed for the cross fading period of time (512 samples in the example of the diagram) from the position of the block head pulse supplied from the phase arithmetic operating circuit 5 to the cross fading circuit 6. The cross fading processed audio signal 14 is shown as an Xfade output in FIG. 13. The cross fading gain is shown by an oblique line. Since both of the memory outputs A and B are smooth signals due to the effect of the synthesis filter, an output without any noise can be derived as a cross fading output.

Figure 14:
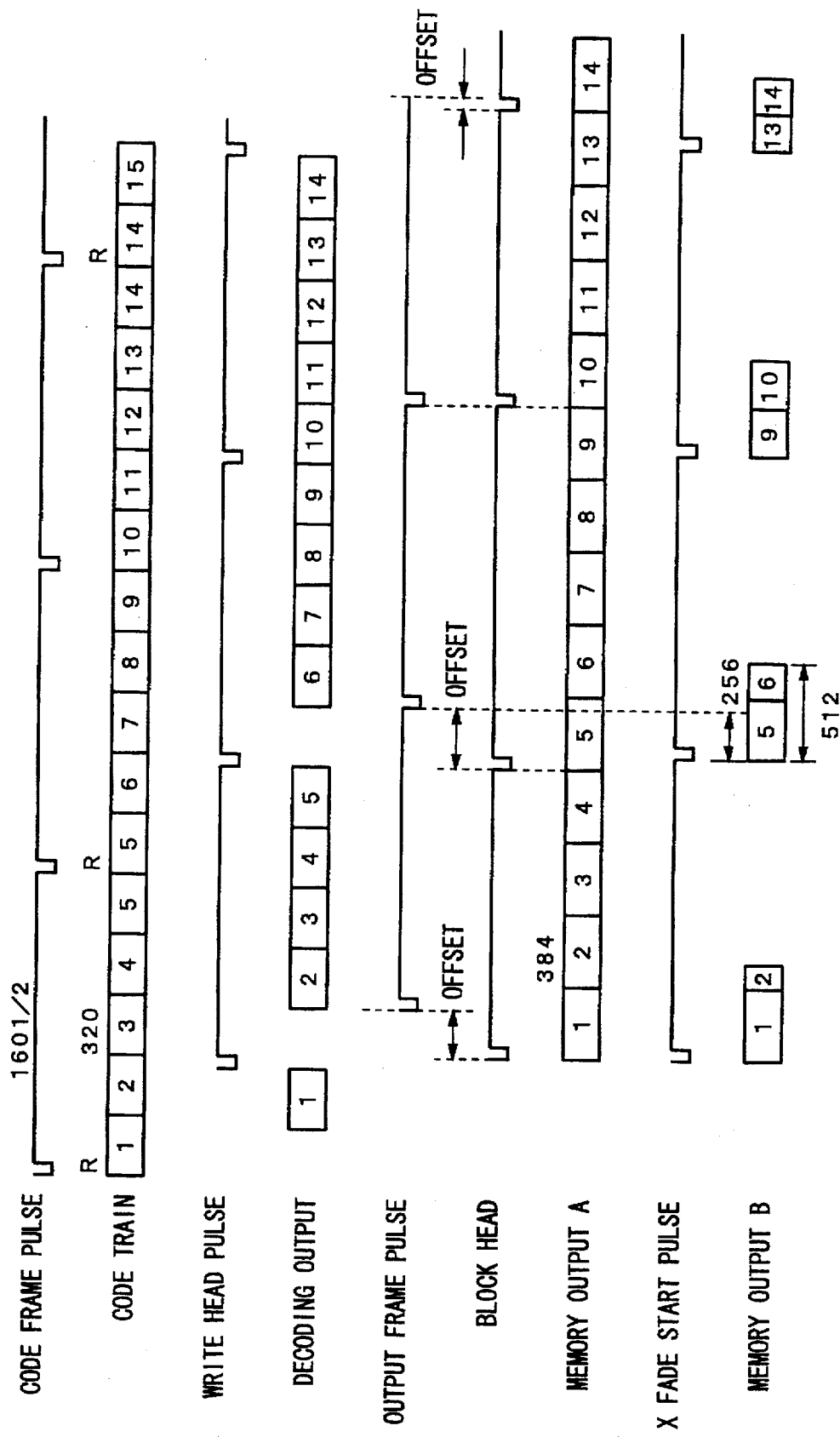
FIG. 14 is a schematic diagram showing an example of each of the input and output signals in the decoding apparatus when decoding continuous frames in the fourth embodiment.
Figure 15:
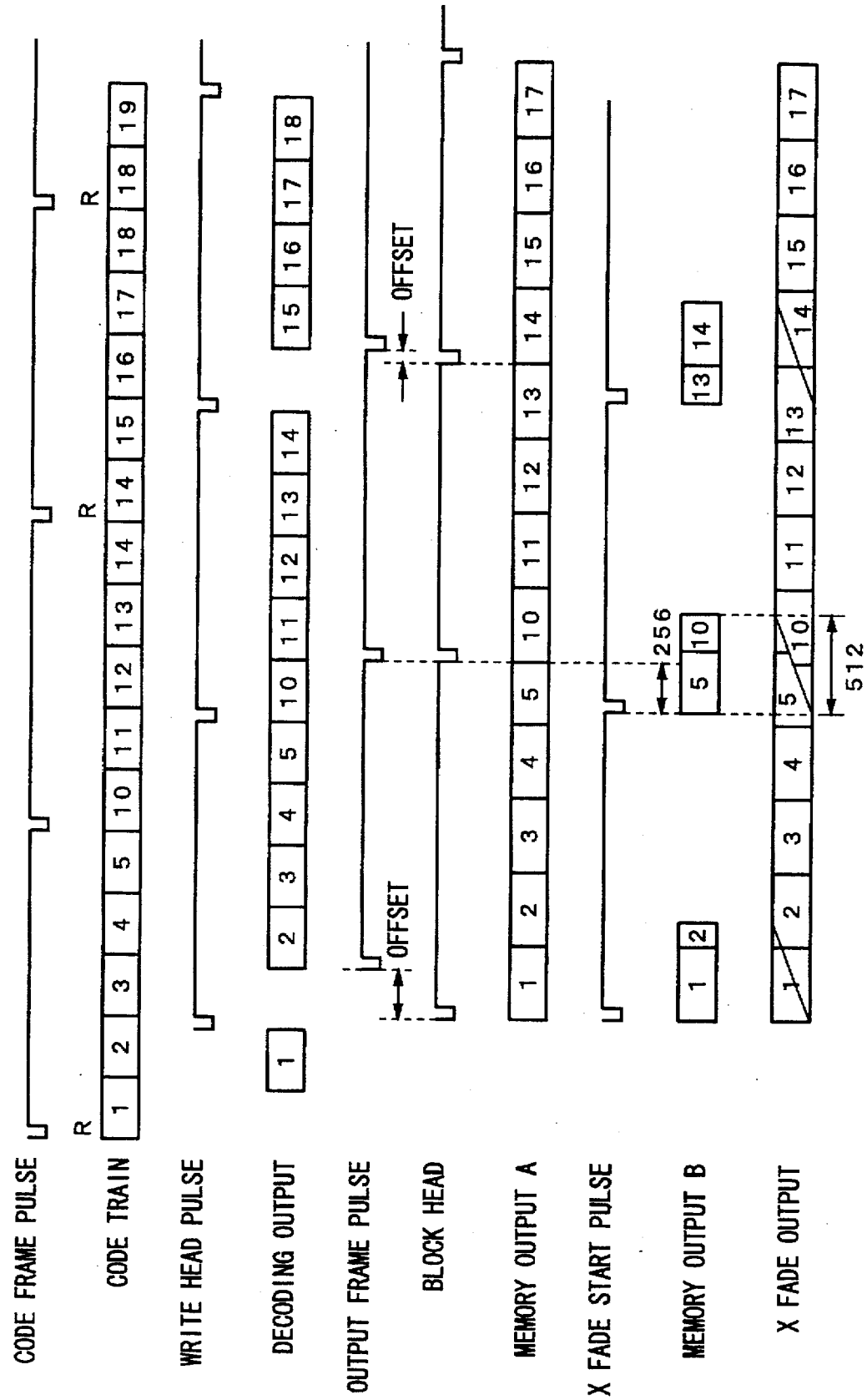
FIG. 15 is a schematic diagram showing an example of each of the input and output signals in the decoding apparatus when no repeat flag is set at the head of the discontinuous frames in the fourth embodiment.
Figure 16:
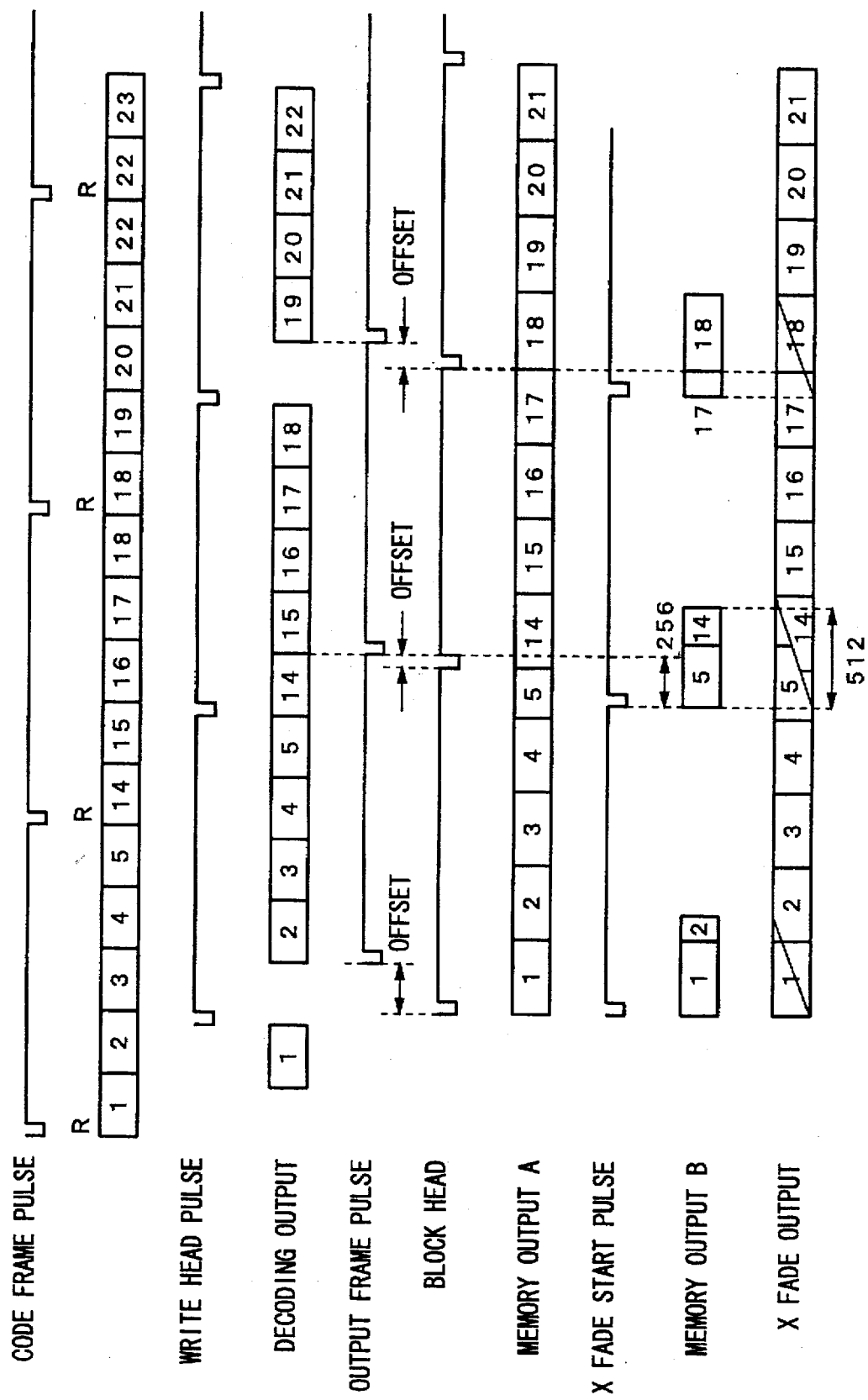
FIG. 16 is a schematic diagram showing an example of each of the input and output signals in the decoding apparatus when the repeat flag has been set at the head of the discontinuous frames in the fourth embodiment.

The fourth embodiment of the invention will now be described with reference to the drawings. In the embodiment as well, the decoding apparatus 1 shown in FIG. 1 is used in a manner similar to the foregoing first embodiment. In the example, when continuous frames are decoded, the decoding operation is temporarily stopped in a manner similar to the foregoing first, second, and third embodiments. On the other hand, when decoding the discontinuous frames, the decoding operation is not temporarily stopped. Processes when the repeat flag is not set at the head of the discontinuous frames are also similar to those in the foregoing first, second, and third embodiments. In the embodiment, however, the process when the repeat flag has been set at the head of the discontinuous frames differs from those of the above embodiments and the decoding operation is not temporarily stopped. FIGS. 14, 15, and 16 show examples of each of the input/output signals when data of the MPEG (Layer I) is multiplexed to a video frame of the 525/59.94 system in the decoding apparatus 1 in those cases.

The code train 10 supplied to the MPEG decoding circuit 2 is delayed by a predetermined amount and, after that, it is converted into the audio signal (decoded output). Upon decoding, as shown in FIG. 16, the operation is temporarily stopped for the block which is repeated in the continuous frame and the decoding is always executed at the head of the discontinuous frames.

In FIG. 16, the 1st, 14th, 18th, and 22nd blocks are repeatedly recorded upon encoding. They can be detected from the offset value. The offset value has been set out of a range of predetermined values, in the example, in an interval of 384T, namely, from −351T to +32T while setting the frame pulse to the center by the phase comparing circuit 106 upon encoding. Therefore, so long as the offset value is out of a range of ±32, the detected repeat pulse is supplied from the offset extracting circuit 3 to the MPEG decoding circuit 2. In this instance, the repeat flag is set to "1". In the MPEG decoding circuit 2, when the code block which corresponds to the above pulse and was recorded at the second time is a continuous frame, the decoding process is temporarily stopped and the process is started after the next block was inputted. In the example of FIG. 16, the decoding processes of the 1st, 18th, and 22nd blocks are temporarily stopped. On the other hand, in the 14th block as a head block of the discontinuous frames, the decoding process is not stopped but is executed.

When the repeat flag has been set at the head of the continuous frame, the decoding process is temporarily stopped. The temporary stopping process is a process which is necessary for the decoding process of the data near the boundary of the blocks. In the MPEG decoding circuit 2, the supplied code train 10 is supplied to, for example, the synthesis filter of 512 taps in the MPEG decoding circuit 2 and is converted into the audio signal. Therefore, the data of 256 samples near the boundary of the adjacent blocks is mutually influenced, so that the correct audio signal is outputted.

As mentioned above, therefore, while the block of the code train which was repeatedly recorded is supplied to the synthesis filter, the decoding process is temporarily stopped, so that the block and the code train data of the block are apparently continuously processed and the data near the boundary is correctly decoded.

The output of the MPEG decoding circuit 2 is an output in which the blocks are dropped out as shown in a decoded output of FIG. 16. This output is supplied to the memory circuit 4. The output of the offset extracting circuit 3 is also supplied to the phase arithmetic operating circuit 5 together with the output frame pulse 13. In the phase arithmetic operating circuit 5, an arithmetic operation is executed on the basis of those signals and the write head pulse which was subjected to a delay that is required for the process of the MPEG decoding circuit 2 is outputted from the code fame pulse 12. The outputted head pulse and the repeat pulse detected from the offset extracting circuit 3 are supplied to the memory circuit 4.

A processing clock of the writing process of the MPEG decoding circuit 2 and memory circuit 4 is a frequency to treat the data (1920 samples) of five blocks per frame. A processing clock of the reading process of the memory circuit 4 is a frequency to teat the data of 1602/1601 samples per frame. The memory circuit 4 has a time base function, so that the decoded output which is intermittently supplied is time base converted into the continuous audio signal.

In the memory circuit 4, the writing of the decoded output into the memory is started from the position of the write head pulse. However, in the frame which is continuous and in which the repeat flag has been set to "1", the writing of the head block is not executed but the writing is performed from the second block. Therefore, only the blocks shown in the decoded output of FIG. 16 are stored into the memory of the memory circuit 4.

As shown in FIG. 16, at the switching point (editing point), the 5th and 14th blocks as code blocks are neighboring. In this instance as well, in a manner similar to the foregoing first, second, and third embodiments, the samples near the boundary of the adjacent blocks are mutually influenced due to the effect of the synthesis filter in the decoding step and a smooth output is derived.

The reading operation from the memory of the memory circuit 4 is divided into two systems of the read A and read B. The read A is executed from the position of the block head pulse which is formed by the phase arithmetic operating circuit 5 from the output frame pulse 13 and the offset extracted by the offset extracting circuit 3. The head read address is corrected every block. As shown in FIG. 16, therefore, the latter half position portion of the fifth block is dropped out at the position of the block head pulse corresponding to the block which was switched by the switching (edition) and the head of the 14th block is subsequently outputted.

In the embodiment, by always setting the timing of the read B to a position that is 256 samples before the output frame pulse, the center of the cross fading is always located at the position of the output frame pulse. The timing of the read B is shown as an Xfade start pulse in FIGS. 14, 15, and 16.

The read B is outputted for only the cross fading period of time (512 samples in the example of FIG. 16) from the position of the Xfade start pulse. The data subsequent to the data read out by the read A just before is read out. Namely, in the discontinuous portion in FIG. 16, the latter half portion of the fifth block read out in the read A is read out and the head of the 14th block is subsequently outputted.

The memory outputs A and B are supplied to the cross fading circuit 6 and are cross fading processed. The resultant signal is outputted as an audio signal 14. The cross fading process is executed each time at the position of the head block from the position of the Xfade start pulse for the cross fading period of time (512 samples in the example of FIG. 16) and even at positions other than the switching point (editing point). In this instance, at the points other than the switching point (editing point), since the memory outputs A and B become the same signal, the output signal is not changed by the cross fading process. The cross fading processed audio signal 14 is shown as an Xfade output in FIG. 16. The cross fading gain is shown by an oblique line. Since both of the memory outputs A and B are smooth signals due to the effect of the synthesis filter, an output without any noise can be derived as a cross fading output.

Different from the method according to the foregoing first embodiment, in the embodiment, the processing method is changed in case of decoding the continuous frames and in case of decoding the discontinuous frames. Thus, the memory output B at the discontinuous points shown in FIG. 16 is set to the 14th and 15th blocks and is smoother as compared with the cross fading output shown in FIG. 9 in the first embodiment mentioned above.

Similarly, since the processing method is changed in case of decoding the continuous frames and in case of decoding the discontinuous frames, in the cross fading process according to this example, as mentioned above, there is no need to perform the switching at the position of the head block every time other than the switching point (editing point) and it is also possible to perform the switching at only the position of the head block of the discontinuous frames.

In the embodiment, it is necessary to detect the discontinuous frames. An example of the detection will be described. In the embodiment, compression data (sampling at 48 kHz) of 384 samples/block of the 525/59.94 system is recorded on a frame unit basis. In this case, since there are 8008 samples/5 frames, the sequence is completed by 240 frames. Therefore, by recording the frame number into the area of 8 bits of each frame upon encoding, the discontinuous point of the frame can be detected upon decoding. Namely, by sequentially recording the numbers of 0 to 239 on a frame unit basis and detecting the discontinuity of the recorded frame numbers on the reproducing side, the discontinuous frames can be detected.

Even for the foregoing second and third embodiments as well, as shown in the embodiment, the start timing for cross fading can be determined to a predetermined phase for the output frame pulse. An arbitrary period of time can be also selected as a cross fading period of time.

In the above description, although the compression data recording unit has been set to the frame, the invention is not limited to such an example. For example, one or a plurality of fields can be set to the unit.

According to the invention as described above, in the apparatus such that the data compressed audio data is reproduced on a video frame or field unit basis, when the switched (edited) data is reproduced, the cross fading can be applied. Therefore, there is an effect such that a smooth reproduction output without any noise can be obtained at the switching point (editing point) at which the sound quality conventionally deteriorated due to the muting process.

We claim:

1. A compression data editing apparatus for performing an edition on a frame or field unit basis to a data compressed audio signal synchronously with a frame or a field of a video signal, characterized by comprising:

encoding means for encoding an input audio signal on a unit basis of a block pulse which is inputted, detecting phase difference information between said block pulse and the frame of the video signal, adding said phase difference information to an encoded code train, and outputting a resultant code train;

offset extracting means for detecting an offset value from said phase difference information from the code train which is supplied from said encoding means, outputting said offset value, and outputting a repeat pulse when said offset value is out of a range of predetermined values;

phase arithmetic operating means for outputting a block head pulse from a frame pulse of said video signal and the offset value which is supplied from said offset extracting means;

decoding means for stopping a decoding of the code train which is inputted for a predetermined period of time when said repeat pulse is supplied from said offset extracting means and decoding said code train and outputting as an audio signal when said repeat pulse is not supplied;

memory means composed of a first output system which is constructed in a manner such that a writing of the audio signal from said decoding means is started from a position of the block head pulse that is supplied from said phase arithmetic operating means, when the repeat pulse that is supplied from said offset extracting means is inputted, the writing of the audio signal is not performed from the position of the block head pulse, and when said block head pulse is inputted, said written audio signal is read out from a position of said pulse and outputted and a second output system for outputting an audio signal subsequent to the audio signal that is outputted by said first output system from said block head position for a predetermined period of time; and cross fading processing means for performing a cross fading process to the audio signal that is supplied from said memory means for said predetermined period of time from the position of the block head pulse from said phase arithmetic operating means and outputting the audio signal.

2. A compression data editing apparatus according to claim 1, characterized in that in said decoding means, when said repeat pulse is inputted, an encoding of the code train is stopped for a period of time during which blocks of the code train in which the code train that is supplied from said encoding means has repeatedly been divided into blocks and a repeat flag has been set to "1" are inputted.

3. A compression data editing apparatus according to claim 1, characterized in that in said decoding means, when said repeat pulse is inputted, the decoding of said code train is stopped for a predetermined period of time from a position where said repeat pulse is inputted.

4. A compression data editing apparatus according to claim 1, characterized in that the encoding block pulse of the audio signal and the frame pulse of the video signal are supplied to said offset extracting means and the offset value is detected from a phase difference between said block pulse and said frame pulse and is outputted.

5. A compression data editing apparatus according to claim 1, characterized in that said second output system of said memory means outputs the audio signal subsequent to the audio signal that is outputted by said first output system for a cross fading period of time from said block head position.

6. A compression data editing apparatus according to claim 1, characterized in that said cross fading processing means performs the cross fading process to the audio signal that is supplied from said memory means for a cross fading period of time from a position of the block head pulse from said phase arithmetic operating means and outputs the audio signal.

7. A compression data editing apparatus for performing an edition to a data compressed audio signal synchronously with a frame or a field of a video signal, characterized by comprising:

encoding means for encoding an input audio signal on a unit basis of a block pulse which is inputted, detecting phase difference information between said block pulse and a frame pulse of the video signal, adding said phase difference information to an encoded code train, and outputting a resultant code train;

offset extracting means for detecting an offset value from said phase difference information from the code train which is supplied from said encoding means and outputting said offset value;

phase arithmetic operating means to which the offset value that is supplied from said offset extracting means and the frame pulse of the video signal are inputted and which outputs a block head pulse in the frame;

switching means for supplying a switching pulse indicative of position information of an editing point of the video signal;

decoding means for stopping a decoding of the code train that is supplied from said encoding means for a predetermined period of time when said switching pulse is inputted, decoding the code train that is inputted when said switching pulse is not inputted, converting said decoded code train into the audio signal, and outputting said audio signal;

memory means composed of a first output system which is constructed in a manner such that when said block head pulse which is supplied from said phase arithmetic operating means is inputted, a writing of the audio signal which is outputted from said decoding circuit is started from a position of said pulse, when said switching pulse which is supplied from said switching means is supplied, the writing is not executed for an interval from a block of the code train before an editing point to a point just before a block of the first code train after the editing point, and a reading of said written audio signal is executed from a position where said block head pulse is supplied and a second output system for outputting an audio signal subsequent to the audio signal which is outputted from said first output system for a predetermined period of time from the position where said block head pulse is inputted; and cross fading processing means for executing a cross fading process to the audio signal which is supplied from said memory means for a predetermined period of time from the position of the block head pulse which is supplied from said phase arithmetic operating means and outputting the audio signal.

8. A compression data editing apparatus according to claim 7, characterized in that in said decoding means, when said switching pulse is inputted, the writing is not performed for an interval from the block of the code train before the editing point to a point just before the block of the first code train after the editing point.

9. A compression data editing apparatus according to claim 7, characterized in that the second output system of said memory means outputs the audio signal subsequent to the audio signal which is outputted from the first output system for a cross fading period of time from a position where said block head pulse is inputted.

10. A compression data editing apparatus according to claim 7, characterized in that said cross fading processing means executes the cross fading process to the audio signal which is supplied from said memory means for a cross fading period of time from the position of the block head pulse which is supplied from said phase arithmetic operating means and outputs the audio signal.

11. A compression data editing apparatus for performing an edition to a data compressed audio signal synchronously with a frame or a field of a video signal, characterized by comprising:

encoding means for encoding an input audio signal on a unit basis of a block pulse which is inputted, detecting a phase difference between said block pulse and a frame pulse of the video signal which is inputted, adding said phase difference as phase difference information to an encoded code train, and outputting a resultant code train;

offset extracting means for detecting the phase difference information from the code train which is supplied from said encoding means, detecting an offset value, outputting said offset value, and outputting a repeat pulse when said offset value is out of a range of predetermined values;

decoding means for stopping a decoding of the code train for a predetermined period of time when the repeat pulse which is supplied from said offset extracting means is inputted and when a block of the code train of the continuous frames having no editing point is supplied from said encoding means, decoding said code train when the block of the code train of discontinuous frames having the editing point is supplied, and decoding said code train and converting into the audio signal and outputting said audio signal when said repeat pulse is not inputted;

phase arithmetic operating means to which the offset value that is supplied from said offset extracting means and the frame pulse of the video signal are inputted and which outputs a block head pulse;

memory means composed of a first output system which is constructed in a manner such that the block head pulse that is supplied from said phase arithmetic operating means and the repeat pulse that is supplied from said offset extracting means are inputted, a writing of the audio signal that is supplied from said decoding means is executed from a position of said block head pulse, the writing of the continuous audio signal that has no editing point and corresponds to the code train in which the repeat pulse is supplied is not executed for a predetermined period of time, when said block head pulse is inputted, the written audio signal is read out and outputted from the position of said pulse and a second output system for reading out and outputting the audio signal subsequent to the audio signal read out from the first output system for a predetermined period of time from the position of said head block pulse; and cross fading means to which the audio signal that is supplied from said memory means is inputted and which executes a cross fading process for a predetermined period of time from a position of said head block pulse that is supplied from said phase arithmetic operating means and outputs the audio signal.

12. A compression data editing apparatus according to claim 11, characterized in that in said decoding means, when said repeat pulse is inputted and when the block of the code train of the continuous frames having no editing point is supplied from said encoding means, as for the decoding of the code train, the encoding of said code train is stopped for a period of time during which the blocks of the code train in which the repetitive code trains are divided into blocks and the repeat flag has been set to "1" are inputted from said encoding means.

13. A compression data editing apparatus according to claim 11, characterized in that when the blocks of the code train of the continuous frames having no editing point are supplied from said encoding means when said repeat pulse is inputted, said decoding means stops the decoding of said code train for a predetermined period of time from the position where said repeat pulse is inputted.

14. A compression data editing apparatus according to claim 11, characterized in that the encoding block pulse of the audio signal and the frame pulse of the video signal are supplied to said offset extracting means, and said offset extracting means detects the offset value from the phase difference between said block pulse and said frame pulse and outputs the offset value.

15. A compression data editing apparatus according to claim 11, characterized in that the second output system of said memory means outputs the audio signal subsequent to the audio signal which is outputted by said first output system for the cross fading period of time from the position of said block head pulse.

16. A compression data editing apparatus according to claim 11, characterized in that said cross fading processing means executes the cross fading process to the audio signal which is supplied from said memory means for a cross fading period of time from the position of the block head pulse which is supplied from said phase arithmetic operating means and outputs the audio signal.

17. A compression data editing apparatus according to claim 11, characterized in that in said memory means, as for the continuous audio signal which has no editing point and corresponds to the code train in which said repeat pulse is supplied, the writing of the head block in the frame is not executed for a unit block period of time.

18. A compression data editing apparatus according to claim 11, characterized in that as for the reading of the second output system of said memory means, the reading is executed at a timing that is earlier than the frame pulse of the video signal by a predetermined period.

* * * * *